(12) United States Patent
Alsup

(10) Patent No.: US 7,003,629 B1
(45) Date of Patent: Feb. 21, 2006

(54) SYSTEM AND METHOD OF IDENTIFYING LIVENESS GROUPS WITHIN TRACES STORED IN A TRACE CACHE

(75) Inventor: Mitchell Alsup, Austin, TX (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 337 days.

(21) Appl. No.: 10/615,507

(22) Filed: Jul. 8, 2003

(51) Int. Cl.
G06F 12/08 (2006.01)

(52) U.S. Cl. ...................... 711/118; 712/233

(58) Field of Classification Search ............. 712/201, 712/210, 219, 234, 239, 233; 711/118, 125
See application file for complete search history.

(56) References Cited

U.S. PATENT DOCUMENTS

2004/0143721 A1 * 7/2004 Pickett et al. .............. 711/217

OTHER PUBLICATIONS

Yuan Chou, et al., "Instruction Path Coprocessors," Mar. 2000, pp. 1-24.
Friendly, et al., "Putting the Fill Unit to Work: Dynamic Organizations for Trace Cache Microprocessors," Dept. of Electrical Engineering and Computer Sciences, The Univ. of Michigan, Dec. 1998, 9 pages.
Bryan Black, et al., "Turboscalar: A High Frequency High IPC Microarchitecture," Dept. of Electrical and Computer Engineering, Carnegie Mellon Univ., Jun. 2000, pp. 1-.
Rotenberg, et al., "Trace Cache: A Low Latency Approach to High Bandwidth Instruction Fetching," Apr. 11, 1996, pp. 1-48.
Merten, et al., "An Architectural Framework for Run-Time Optimization," Jun. 2001, pp. 1-43.
Jourdan, et al., "Increasing the Instruction-Level Parallelism through Data-Flow Manipulation," Intel, 11 pages.

* cited by examiner

Primary Examiner—Hiep T. Nguyen
(74) Attorney, Agent, or Firm—Robert C. Kowert; Meyertons, Hood, Kivlin, Kowert & Goetzel, P.C.

(57) ABSTRACT

A microprocessor may include a trace cache and a trace generator. The trace cache includes several trace cache entries. Each trace cache entry is configured to store several operations and a respective set of liveness indications. The operations are generated by at least partially decoding several instructions. The trace generator may be configured to generate the respective plurality of liveness indications for the operations stored in each trace cache entry. Each liveness indication identifies whether its respective operation depends on a branch operation stored within that trace cache entry.

46 Claims, 14 Drawing Sheets

| Liveness | Encoding 266 |
|---|---|
| Unconditionally Live | 11 |
| Subsequent to 1st Branch | 10 |
| Subsequent to 2nd Branch | 01 |
| Unconditionally Dead | 00 |

Before Constant Propagation:

After Constant Propagation:

Before Move Renaming:

MOV  EAX, ESI
  .
  .
  .
ADD  EAX, EAX, 7

FIG. 8A

After Move Renaming:

ADD  EAX, ESI, 7

FIG. 8B

Before Move Renaming:

ADD  EAX, EAX, ESI
  .
  .
  .
MOV  EDI, EAX
       .
       .  (intervening operations do
       .   not use value of EAX)
ADD  EAX, EBX, 2  (value in EAX destroyed)
  X

FIG. 9A

After Move Renaming:

ADD  EDI, EAX, ESI
  .
  .
  .
ADD EAX, EBX, 2

FIG. 9B

Before any transformations:
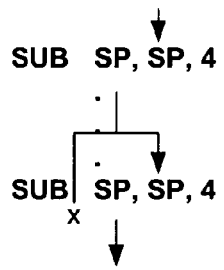
*FIG. 10A*
Slotification:
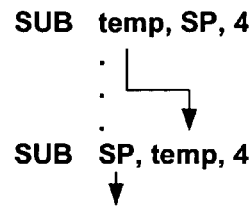
*FIG. 10B*
After Constant Propagation:
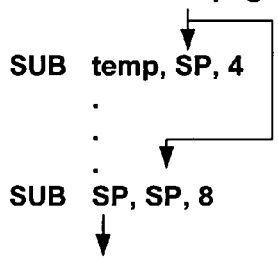
*FIG. 10C*
After Dead Operation Elimination:
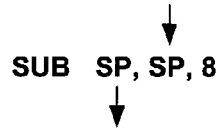
*FIG. 10D*
Before:
Op1   Sets condition code
·     (intervening instructions do
·     not set condition code)
·
JNE   Label
*FIG. 11A*
After Branch Folding:
Op1   Sets condition code; fail if NE
*FIG. 11B*

Instruction Stream:

**Instruction1
Instruction2
Instruction3
Microcoded Instruction
Instruction4
Instruction5**

.
.
.

SYSTEM AND METHOD OF IDENTIFYING LIVENESS GROUPS WITHIN TRACES STORED IN A TRACE CACHE

BACKGROUND OF THE INVENTION

1. Field of the Invention

This invention is related to the field of microprocessors, and more particularly, to caching traces of at least partially decoded operations within a trace cache included in a microprocessor.

2. Description of the Related Art

Instructions processed in a microprocessor are encoded as a sequence of ones and zeros. For some processor architectures, instructions may be encoded with a fixed length, such as a certain number of bytes. For other architectures, such as the x86 architecture, the length of instructions may vary. The x86 microprocessor architecture specifies a variable length instruction set (i.e., an instruction set in which various instructions are each specified by differing numbers of bytes). For example, the 80386 and later versions of x86 microprocessors employ between 1 and 15 bytes to specify a particular instruction. Instructions have an opcode, which may be 1–2 bytes, and additional bytes may be added to specify addressing modes, operands, and additional details regarding the instruction to be executed.

In some microprocessor architectures, each instruction may be decoded into one or more simpler operations prior to execution. Decoding an instruction may also involve accessing a register renaming map in order to determine the physical register with which each logical register in the instruction is associated and/or to allocate a physical register to store the result of the instruction.

Instructions are fetched into the decode portion of a microprocessor based, in part, on branch predictions made within the processor. In general, the bandwidth of the instruction fetch and decode portions of a microprocessor may determine whether the execution cores can be fully utilized during each execution cycle. Accordingly, it is desirable to be able to provide enough bandwidth in the instruction fetch and decode portions of the microprocessor to kept the execution core as fully supplied with work as possible.

SUMMARY

Various embodiments of methods and systems for identifying liveness groups within a trace of at least partially decoded operations are disclosed. In one embodiment, a microprocessor may include a trace cache and a trace generator. The trace cache includes several trace cache entries. Each trace cache entry is configured to store a trace that includes several operations. Each trace cache entry also stores a set of liveness indications that are each associated with a respective operation included in the trace. The operations in a given trace may be generated by at least partially decoding one or more instructions. The trace generator may be configured to generate the respective plurality of liveness indications for the operations stored in each trace cache entry. Each liveness indication identifies whether execution of its respective operation depends on branch operation stored within that trace cache entry.

In some embodiments, each trace cache entry may include several operation storage locations each configured to store a single operation. A first portion of the operation storage locations may be dedicated to storage of data operations and a second portion of the operation storage locations may be dedicated to storage of memory operations.

The microprocessor may include a dispatch unit configured to dispatch operations. The dispatch unit may be configured to receive operations and the respective liveness indications associated with each of those operations from the trace cache and to determine whether each operation included in the same trace cache entry is executable dependent on one or more current branch predictions and the liveness indication associated with that operation. The microprocessor may be configured to retire operations included in the same trace cache entry in response to all executable operations within that trace cache entry being ready for retirement.

In some embodiments, the dispatch unit may selectively dispatch operations based on whether those operations are determined to be executable. In other embodiments, the dispatch unit may be configured to dispatch each operation included in the same trace and to generate a signal indicating whether each operation is executable dependent on the liveness indication associated with that operation and the one or more current branch predictions. In such embodiments, each scheduler may be configured to store an indication of whether each dispatched operation is executable and to only issue executable operations to an execution core. If a branch operation resolves differently than predicted, the scheduler may be configured to update one or more indications associated within one or more operations (e.g., to indicate that those operations are now executable (live) or now not executable (dead)).

Each liveness indication may be specified as one of several liveness encodings. Operations included within the same trace and having the same liveness encoding do not need to be stored in adjacent operation storage locations in many embodiments. One liveness encoding may indicate that execution of a respective operation is not dependent on any branch operations included within the same trace as that operation. Another liveness encoding may indicate that execution of its respective operation is dependent on a first branch operation included within the same trace. Yet another liveness encoding may indicate that execution of its respective operation is dependent on two branch operations included within the same trace. In one embodiment, an operation storage location whose associated liveness indication indicates that an invalid operation is stored within may be used to store additional constant data (as opposed to operation information) for use with another valid operation included in the same trace.

One embodiment of a method involves: at least partially decoding a plurality of instructions into a plurality of operations; storing a trace of operations within a trace cache, where the trace of operations includes one or more operations that depend on a conditional branch operation also included in the trace; and generating a liveness indication for each operation included in the trace, where the liveness indication indicates whether execution of a respective operation depends on the outcome (e.g., taken or not taken) of the conditional branch operation.

BRIEF DESCRIPTION OF THE DRAWINGS

A better understanding of the present invention can be obtained when the following detailed description is considered in conjunction with the following drawings, in which:

FIG. 8A shows one or more operations that are candidates for move renaming transformations, according to one embodiment.

FIG. 8B illustrates the operations of FIG. 8A after performance of a move renaming transformation, according to one embodiment.

FIG. 9A illustrates another example of candidates for move renaming transformations, according to one embodiment.

FIG. 9B shows the operations of FIG. 9A after performance of a move renaming transformation, according to one embodiment.

FIG. 10A illustrates one example of operations that are candidates for dead operation elimination transformation, according to one embodiment.

FIGS. 10B–10D respectively illustrate the operations of FIG. 10A after successive performance of various transformations, according to one embodiment.

FIG. 11A illustrates exemplary operations that are candidates for branch folding transformations, according to one embodiment.

FIG. 11B shows the operations of FIG. 11A after performance of a branch folding transformation, according to one embodiment.

Figure 1:
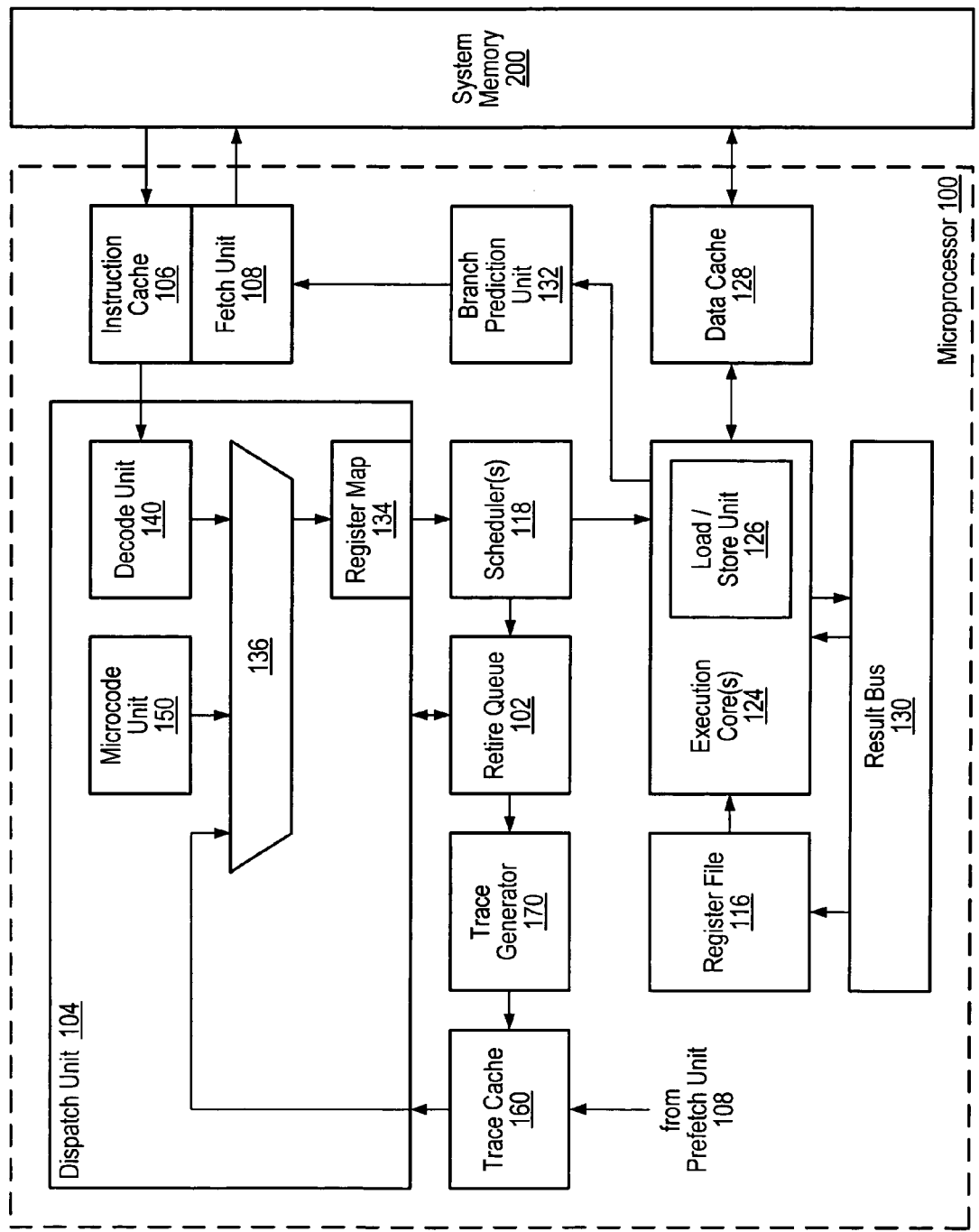
FIG. 1 shows one embodiment of a microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include" and derivations thereof mean "including, but not limited to." The term "connected" means "directly or indirectly connected," and the term "coupled" means "directly or indirectly coupled."

DETAILED DESCRIPTION OF EMBODIMENTS

FIG. 1 is a block diagram of logical components included in one embodiment of a microprocessor 100. Microprocessor 100 is configured to execute instructions stored in a system memory 200. Many of these instructions operate on data stored in system memory 200. Note that system memory 200 may be physically distributed throughout a computer system and may be accessed by one or more microprocessors 100. In some embodiments, the microprocessor 100 may be designed to be compatible with the x86 architecture. Note that microprocessor 100 may also include and/or be coupled to many other components in addition to those shown here. For example, additional levels of cache may be included (internal and/or external to microprocessor 100) between microprocessor 100 and system memory 200. Similarly, microprocessor 100 may include a memory controller configured to control system memory 200 in some embodiments. Additionally, the interconnections between logical components may vary between embodiments.

Microprocessor 100 may include an instruction cache 106 and a data cache 128. Microprocessor 100 may include a fetch unit 108 coupled to the system memory 200. Fetch unit 108 may prefetch instruction code from the system memory 200 for storage within instruction cache 106. In one embodiment, fetch unit 108 may be configured to burst code from the system memory 200 into instruction cache 106. Fetch unit 108 may employ a variety of specific code prefetching techniques and algorithms. Fetch unit 108 may also fetch instructions from instruction cache 106 and traces from trace cache 160 into dispatch unit 104. Instructions may be fetched from instruction cache 106 in response to a given instruction address missing in trace cache 160. Likewise, instructions may be fetched from system memory 200 in response to a given address missing in instruction cache 106.

A dispatch unit 104 may be configured to receive instructions from instruction cache 106 and to receive decoded and/or partially decoded operations from trace cache 160. The dispatch unit 104 may include a decode unit 140 to decode instructions received from instruction cache 106 into component operations. The dispatch unit 104 may also include a microcode unit 150 for use when handling microcoded instructions. Operations from the decode unit 140, microcode unit 150, or trace cache 160 may be provided to a register map 134 via multiplexer 136.

As used herein, the term "instruction" is used to describe non-decoded instructions fetched from instruction cache 106. For example, an instruction may be an x86 instruction. "Operation" refers to a decoded instruction (e.g., a macroOP) that is in a format executable within the processor. A decode unit 140 may be used to decode each instruction fetched from instruction cache 106 into one or more less complex operations. Note that in some embodiments, instructions and operations may be substantially the same.

The dispatch unit 104 is configured to dispatch operations to scheduler(s) 118. One or more schedulers 118 may be coupled to receive dispatched operations from dispatch unit 104 and to issue operations to one or more execution cores 124. Execution core(s) 124 may include a load/store unit 126 configured to perform accesses to data cache 128. Results generated by execution core(s) 124 may be output to a result bus 130. These results may be used as operand values for subsequently issued instructions and/or stored to register file 116. A retire queue 102 may be coupled to scheduler(s) 118 and dispatch unit 104. The retire queue may be configured to determine when each issued operation may be retired.

Instruction cache 106 may temporarily store instructions prior to their receipt by dispatch unit 104. Instruction code may be provided to instruction cache 106 by prefetching code from the system memory 200 through fetch unit 108. Instruction cache 106 may be implemented in various configurations (e.g., set-associative, fully-associative, or direct-mapped).

Dispatch unit 104 may output signals including bit-encoded operations executable by the execution core(s) 124 as well as operand address information, immediate data and/or displacement data. Decode unit 140 may be used to decode certain instructions into one or more operations executable within execution core(s) 124. Simple instructions may correspond to a single operation. More complex instructions may correspond to multiple operations. Upon receiving an operation that involves the update of a register, the dispatch unit 104 may reserve a register location within register file 116 to store speculative register states (in an alternative embodiment, a reorder buffer may be used to store one or more speculative register states for each register). A register map 134 may translate logical register names of source and result operands to physical register names in order to facilitate register renaming. Register map 134 may track which registers within register file 116 are currently allocated and unallocated.

Dispatch unit 104 may include a microcode unit 150. Microcode unit 150 may handle microcoded instructions detected within the instruction stream input to dispatch unit 104. Microcode unit 150 may include and/or be coupled to a ROM (Read Only Memory) that stores microcode routines corresponding to each microcoded instruction. Decode unit 140 may handle microcode entry point generation. Different microcoded instructions may require differing numbers of microcode operations to effect their corresponding functions. Additionally, the number of microcode operations corresponding to a particular MROM instruction may vary according to the addressing mode of the instruction, the operand values, and/or the options included with the instruction. The microcode unit 150 may dispatch the microcode operations to one or more schedulers 118. The microcode operations are thereafter issued and executed in a similar fashion to other decoded operations. It is noted that the microcode operations may be defined within the instruction set, or may be customized for the particular microprocessor on which they are to execute. In some embodiments, microcode operations may be stored in microcode traces within a ROM.

When operations are handled by dispatch unit 104, if a required operand is a register location, register address information may be routed to register map 134 (or a reorder buffer). For example, in the x86 architecture, there are eight 32-bit logical registers (e.g., EAX, EBX, ECX, EDX, EBP, ESI, EDI and ESP). Physical register file 116 (or a reorder buffer) includes storage for results that change the contents of these logical registers, allowing out of order execution. A physical register in register file 116 may be allocated to store the result of each operation that modifies the contents of one of the logical registers. Therefore, at various points during execution of a particular program, register file 116 (or, in alternative embodiments, a reorder buffer) may have one or more registers that contain the speculatively executed contents of a given logical register.

Register map 134 may assign a physical register to a particular logical register specified as a result operand for an operation. Register file 116 may have one or more previously allocated physical registers assigned to a logical register specified as a source operand in a given operation. The register map 134 may provide a tag for the physical register most recently assigned to that logical register. This tag may be used to access the operand's data value from the register file 116 or to receive the data value via result forwarding on the result bus 130. If the operand corresponds to a memory location, the operand value may be provided on the result bus (for result forwarding and/or storage in register file 116) through load/store unit-222. Operand data values may be provided to execution core(s) 124 when the operation is issued by one of the scheduler(s) 118. Note that in alternative embodiments, operand values may be provided to a corresponding scheduler 118 when an operation is dispatched (instead of being provided to a corresponding execution core 124 when the operation is issued).

The microprocessor 100 of FIG. 1 supports out of order execution. A retire queue 102 (or, alternatively, a reorder buffer) may keep track of the original program sequence for register read and write operations, allow for speculative instruction execution and branch misprediction recovery, and facilitate precise exceptions. In many embodiments, retire queue 102 may function similarly to a reorder buffer. However, unlike a typical reorder buffer, retire queue 102 may not provide any data value storage. In alternative embodiments, retire queue 102 may function more like a reorder buffer and also support register renaming by providing data value storage for speculative register states. In some embodiments, retire queue 102 may be implemented in a first-in-first-out configuration in which operations move to the "bottom" of the buffer as they are validated, thus making room for new entries at the "top" of the queue. As operations are retired, retire queue 102 may deallocate registers in register file 116 that are no longer needed to store speculative register states and provide signals to register map 134 indicating which registers are currently free. By maintaining speculative register states within register file 116 (or, in alternative embodiments, within a reorder buffer) until the operations that generated those states are validated, the results of speculatively-executed operations along a mispredicted path may be invalidated in the register file 116 if a branch prediction is incorrect.

A basic block is a set of operations that begins just after a branch operation and ends with another branch operation, such that if any one of the operations in a basic block is executed, all of the operations in that basic block will be executed. Each trace may include operations that are part of several different basic blocks. Retire queue 102 may provide signals identifying program traces to trace generator 170 (which may also be described as a fill unit). Trace generator 170 may store traces identified by retire queue 102 into trace cache 160. The traces stored into trace cache 160 may include several fully decoded or partially decoded operations. As used herein, a "trace" is a group of operations that are stored within a single trace cache entry in the trace cache 160.

Fetch unit 108 may fetch operations from trace cache 160 into dispatch unit 104. When operations are fetched from the trace cache (as opposed to when instructions are loaded from instruction cache 106), the decode unit 140 may be at least partially bypassed, resulting in a decreased number of dispatch cycles for the cached operations fetched from the trace cache 160. Accordingly, the trace cache 160 may allow the dispatch unit 104 to amortize the time taken to partially (or fully) decode the cached operations in decode unit 140 over several execution iterations if traces are executed more than once.

The recoded operations and immediate data provided at the outputs of dispatch unit 104 may be routed to one or more schedulers 118. Note that as used herein, a scheduler is a device that detects when operations are ready for execution and issues ready operations to one or more execution units. For example, a reservation station is a scheduler. Each scheduler 118 may be capable of holding operation information (e.g., bit encoded execution bits as well as operand values, operand tags, and/or immediate data) for several pending operations awaiting issue to an execution core 124. In some embodiments, each scheduler 118 may not provide operand value storage. Instead, each scheduler may monitor issued operations and results available in register file 116 in order to determine when operand values will be available to be read by execution core(s) 124 (from register file 116 or result bus 130). In some embodiments, each scheduler 118 may be associated with a dedicated execution core 124. In other embodiments, a single scheduler 118 may issue operations to more than one of the execution core(s) 124.

Schedulers 118 may be provided to temporarily store operation information prior to execution of those operations by the execution core(s) 124. Additionally, each scheduler may store operation information for operations that have already been executed but may still reissue. Operations are issued to execution core(s) 124 for execution in response to the values of all required operand(s) being available at the time of execution. Accordingly, the order in which operations are executed may not be the same as the order of the original program instruction sequence. Operations that involve speculation may remain in scheduler(s) 118 until they become non-speculative so that they may be reissued if the speculation is incorrect. Operations may not be retired until it is known that the computed result is correct.

In one embodiment, each of the execution core(s) 124 may include components configured to perform integer arithmetic operations of addition and subtraction, as well as shifts, rotates, logical operations, and branch operations. A floating point unit may also be included to accommodate floating point operations. One or more of the execution core(s) 124 may be configured to perform address generation for load and store memory operations to be performed by load/store unit 126.

The execution core(s) 124 may also provide information regarding the execution of conditional branch instructions to branch prediction unit 132. If information from the execution core 124 indicates that a branch prediction is incorrect, the branch prediction unit 132 may flush instructions subsequent to the mispredicted branch that have entered the instruction processing pipeline and redirect fetch unit 108. The redirected fetch unit 108 may then begin fetching the correct set of instructions from instruction cache 106, trace cache 160, and/or system memory 200. In such situations, the results of instructions in the original program sequence that occurred after the mispredicted branch instruction are discarded, including those which were speculatively executed and temporarily stored in load/store unit 126 and/or register file 116. If the mispredicted operation is included in a trace read from trace cache 160, the branch prediction unit 132 may flush instructions subsequent to the mispredicted branch as described in more detail below.

Results produced by components within execution core(s) 124 may be output on the result bus 130 to the register file 116 if a register value is being updated. If the contents of a memory location are being changed, the results produced within execution core(s) 124 may be provided to the load/store unit 126.

Load/store unit 126 provides an interface between execution core(s) 124 and data cache 128. In one embodiment, load/store unit 126 may be configured with a load/store buffer with several storage locations for data and address information corresponding to pending loads or stores. The load/store unit 126 may also perform dependency checking for load instructions against pending store instructions to ensure that data coherency is maintained.

Data cache 128 is a cache memory provided to temporarily store data being transferred between load/store unit 126 and the system memory 200. Like the instruction cache 106 described above, the data cache 128 may be implemented in a variety of specific memory configurations, including a set associative configuration. Additionally, data cache 106 and instruction cache 128 may be implemented in a unified cache in some embodiments.

Identification of Liveness Groups within a Trace

Figure 2A:
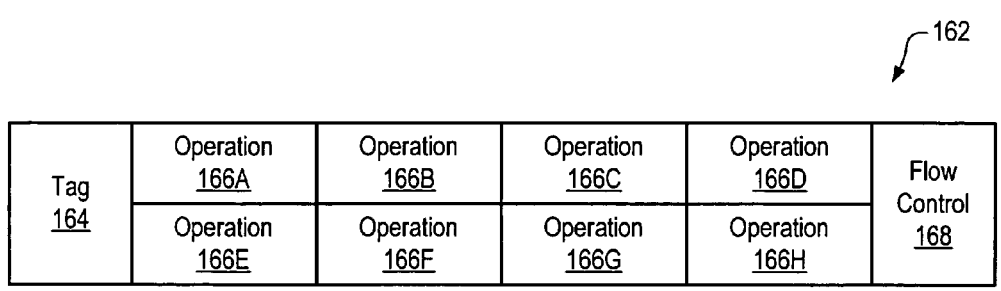
FIG. 2A illustrates an exemplary trace cache entry, according to one embodiment.

Trace cache 160 shown in FIG. 1 includes several trace cache entries. Each trace cache entry may store a group of operations referred to as a trace. As used herein, a "trace" is a group of information that includes a unique label (such as tag 164 below) identifying the remaining information, several containers for semantic operations, several addresses identifying successor traces in the trace cache and/or instructions in the instruction cache, and flow control information. FIG. 2A illustrates one embodiment of a trace. In the embodiment of FIG. 2A, a trace cache entry 162 may store up to eight decoded and/or partially decoded operations in operation storage units 166A–166H. Throughout this disclosure, drawing elements identified by the same reference numeral and a unique alphabetic identifier (e.g., operation storage units 166A–166H) may be collectively referred to by that reference numeral alone (e.g., operation storage units 166). Note that other embodiments may include fewer or additional operation storage units 166, allowing storage of a different number of operations within each trace cache entry 162.

Certain operation storage units 166 within a trace cache entry 162 may be reserved for certain types of operations. For example, in one embodiment, operation storage units 166A–166D may be used to contain memory operations. Similarly, operation storage units 166E–166H may be used to contain data operations. Note that other embodiments may associate certain types of operations with certain operation storage units differently (or not at all). Operations may be stored in operation storage units 166 in such a way that the data flow order between operations in the same trace cache entry 162 is readily apparent from the register dependencies between operations.

In addition to including several operation storage units 166, each trace cache entry 162 also includes an identifying tag 164 and flow control information 168. Tag 164 may be similar to a tag in instruction cache 106, allowing fetch unit 108 to determine whether a given operation hits or misses in trace cache 160. For example, tag 164 may include all or some of the address bits identifying an operation within the trace cache entry (e.g., the tag may include the address of the earliest operation, in program order, stored within that trace). In some embodiments, the tag 164 may include enough information that multiple operations (or at least the first operation within each liveness group) may be independently addressable within a trace. For example, the tag 164 may provide a fetch address for the first operation, in program order, within each liveness group in the trace, allowing each different liveness group to be associated with a different fetch address. In other embodiments, only the first operation within a trace may be uniquely addressable. Thus, in some embodiments, a tag 164 may provide a means for associating multiple instructions with a single starting fetch address (e.g., the fetch address of the first operation, in program order, within the trace).

In the illustrated embodiment, each trace may include up to two conditional branch operations. Other embodiments may include fewer or additional branch operations (conditional or unconditional) within each trace. Flow control information 168 may include a target label for each conditional branch operation included within the trace. The target label may be an indication identifying the address to which control should transfer depending on the resolution (taken, not taken) of a respective conditional branch in the trace. Thus, each item of flow control information 168 may be associated with a particular conditional branch operation in the trace. For example, in one embodiment, one flow control information storage location within a trace may be associated with the first conditional branch operation in the trace and the other flow control information storage location may be associated with the second conditional branch in the trace. Alternatively, the flow control information may include tags or other information identifying the branch operation with which that flow control information is associated. In yet other embodiments, a branch prediction and/or information identifying which flow control information corresponds to a branch operation may be stored with that branch operation within operation storage 166. In addition to being obtained from flow control information 168, successor addresses of instructions or traces to which control should flow subsequent to execution of a group of operations in the trace may also be obtained from the top of the call/return stack and from the jump indirection table.

Figure 2B:
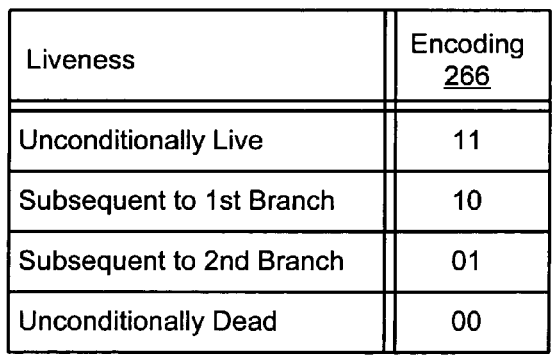
FIG. 2B is a table of liveness encodings that may be used to identify the liveness group in which each operation in a trace belongs, according to one embodiment.
Figure 2C:
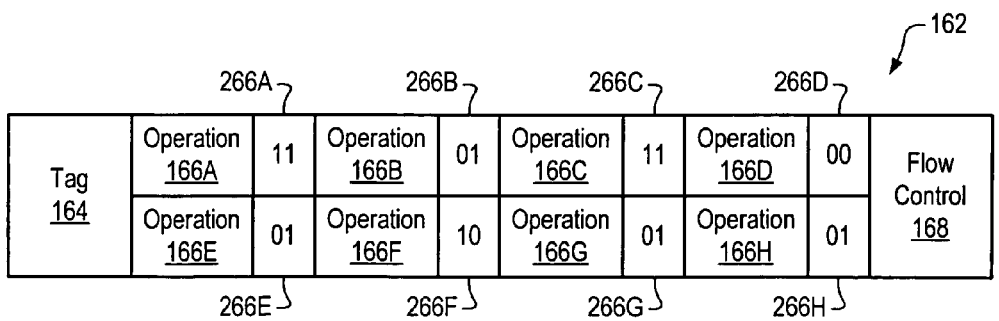
FIG. 2C illustrates an exemplary trace cache entry that includes liveness encodings, according to one embodiment.

Each operation 166 within a trace may have an associated liveness indication 266, as shown in FIG. 2C. Liveness indications 266 provide a means of determining which operations in a given trace come before or after a particular conditional branch operation included in that trace. Each operation's liveness indication 266 may be stored with its associated operation in one of operation storage units 166. Liveness indications 266 identify the liveness group in which each operation belongs. Each liveness group is a set of operations within the trace that are part of the same basic block. For example, the operations up to and including the first branch operation, in program order, within the trace may be included in one liveness group. Operations whose execution is dependent on the resolution of the first branch operation may be included in another liveness group. Thus, a liveness group is similar to a basic block in that operations in the same liveness group will either all be executed or all not be executed; A liveness group differs from a basic block in that operations in the same basic block may be included in different traces (e.g., some operations within the basic block may be included in the final liveness group within one trace and the remaining operations in that basic block may be included in the first liveness group in another trace). Thus, operations within the same liveness group are necessarily part of the same basic block, but operations within the same basic block may not necessarily be part of the same liveness group (i.e., if that basic block spans more than one trace cache entry).

The liveness indications 266 identify each operation's program order relative to the branch operation(s) included in the same trace cache entry. Operations in a first liveness group are not dependent on the outcome of the first branch operation within the trace. Note that since execution of the first branch operation is not conditional, the first branch operation is part of the first liveness group. These operations in the first liveness group may be identified with a different liveness indication than is used to identify a second liveness group of operations that occur after the first branch operation. Similarly, instructions in a third liveness group that depend on the outcomes of both the first branch operation and a second branch operation (i.e., the final operation included in the second liveness group) may be identified with yet another liveness indication. Liveness indications allow operations to be stored within a trace cache entry 162 in an order that differs from their program order while still allowing the program order (relative to the branch operations) of the operations to be determined.

Additionally, liveness indications 266 allow dispatch unit 104 to predict which operations within a particular trace will be executed. Operations in the first liveness group (i.e., operations that are not dependent on the first conditional branch included in a trace) will always be executed (assuming any operations at all within the trace execute). However, execution of operations in the second liveness group (i.e., operations that depend on the first conditional branch) depends on the outcome of the first conditional branch. For example, in embodiments where the trace generator 170 is included at the back-end of the processing pipeline of microprocessor 100, operations may be stored in traces according to the order in which those operations executed so that if the operations are subsequently executed again, they may be accessed from the trace cache instead of from the instruction cache. Thus, if the first conditional branch stored within the trace was taken the first time that branch executed, the operations stored in the second liveness group may be the operations that should be executed if the first conditional branch is taken. Accordingly, if the trace is later provided to dispatch unit 104 and the current branch prediction for the first conditional branch is "not taken," the dispatch unit 104 may predict that the operations in the second liveness group should not be executed. The flow control information 168 associated with the first conditional branch operation may also be used to begin prefetching instructions or traces that should be executed if the first conditional branch is not taken.

FIG. 2B shows exemplary liveness encodings that may be used in one embodiment. The first liveness encoding, "unconditionally live," may be used to identify the first (in program order) liveness group within the trace. Operations in this liveness group are unconditionally live in the sense that, if the trace is executed, these operations will always be executed. The first liveness group may include a conditional branch operation as the final operation (in program order) within that liveness group. These operations are not dependent on any conditional branch operations included within the same trace. In many embodiments, these operations may be stored in any order relative to each other within the trace.

The next liveness encoding, "subsequent to first branch" is used to identify the second (in program order) liveness group within the trace. These operations are dependent on the outcome of the first conditional branch operation, which is included in the previous liveness group. Note that if any operations within this liveness group are non-speculatively executed, all operations within this liveness group will be executed.

The third liveness encoding, "subsequent to second branch" is used to identify the third (in program order) basic block within the trace. These operations are dependent on the outcome of both the first and the second conditional branch operations within the trace. Thus, these operations may not execute even if operations having the second liveness encoding execute. As above, if any operations within this liveness group are non-speculatively executed, all operations within this liveness group will be executed.

The "unconditionally dead" liveness encoding may be used to identify an unused operation storage unit 166. Operation storage units 166 may be unused if more than the maximum number of conditional branch operations occur within a set of operations. For example, if up to eight operations can be stored in a trace and if only two conditional branch operations can be stored in a trace, then fewer than eight operations may be stored in a trace if a given set of eight operations includes three branch operations. Thus, if a maximum limit is placed on the number N of conditional branch operations that may be stored within a trace, storage of the Nth conditional branch operation in the trace may end the trace. Furthermore, in some embodiments, if a certain operation is stored within a trace, subsequent operations (in program order) may not be stored within the trace, even if operation storage is available. For example, subroutine call operations may end a trace (e.g., so that the first operation within the subroutine may be stored as the first operation within another trace, allowing the tag of that operation to be used as a trace tag). Similarly, subroutine return operations may end a trace.

Additionally, in some embodiments, the presence of the "unconditionally dead" liveness encoding in an operation storage unit may indicate that additional bits for use with another operation in the trace may be stored within that operation storage unit. This may allow reduced operation storage unit size in some embodiments. For example, in one embodiment, the lower four operation storage units 166E–166H may be used to contain data operations. Each data operation storage unit 166E–166H may include storage for eight bits of immediate data. If a data operation included in the trace has more than eight bits of immediate data, the additional immediate data bits may be stored in one of the upper operation storage units 166A–166D. In one embodiment, operation storage units may be vertically linked (e.g., operation storage units 166A and 166E may be linked and so on) such that if one of the upper operation storage units has an "unconditionally dead" liveness indication, it indicates that upper operation storage unit may be storing additional information for its linked lower operation storage unit. Note that "upper" and "lower" describe an illustrative relationship and do not necessarily describe a physical relationship between operation storage units.

FIG. 2C illustrates how operations may be stored in an unordered fashion within a trace cache entry 162. Each operation's associated liveness indication 266 is encoded using one of the encodings of FIG. 2B. The exemplary arrangement of liveness indications illustrates how operations from different liveness groups may be stored adjacently within a trace cache entry 162. Thus, the liveness indications allow operations to be reordered and/or combined within a trace. This in turn may allow operations to be stored within the trace more efficiently, such that more operations can be stored in a trace cache entry 162 of a given size than would be possible without the use of liveness indications.

Looking back at FIG. 1, trace generator 170 may be configured to generate the appropriate liveness encoding for each operation and to store that liveness encoding within the same operation storage unit 166 as the operation within a trace in trace cache 160. Trace generator 170 may generate liveness encodings for each operation based on information about the outcome of each branch the first time each branch operation was executed. This information may be provided from retire queue 102. Additional information may be provided from branch prediction unit 132 identifying the predicted outcome and/or the success of each prediction for each branch in one or more prior executions.

Figure 3:
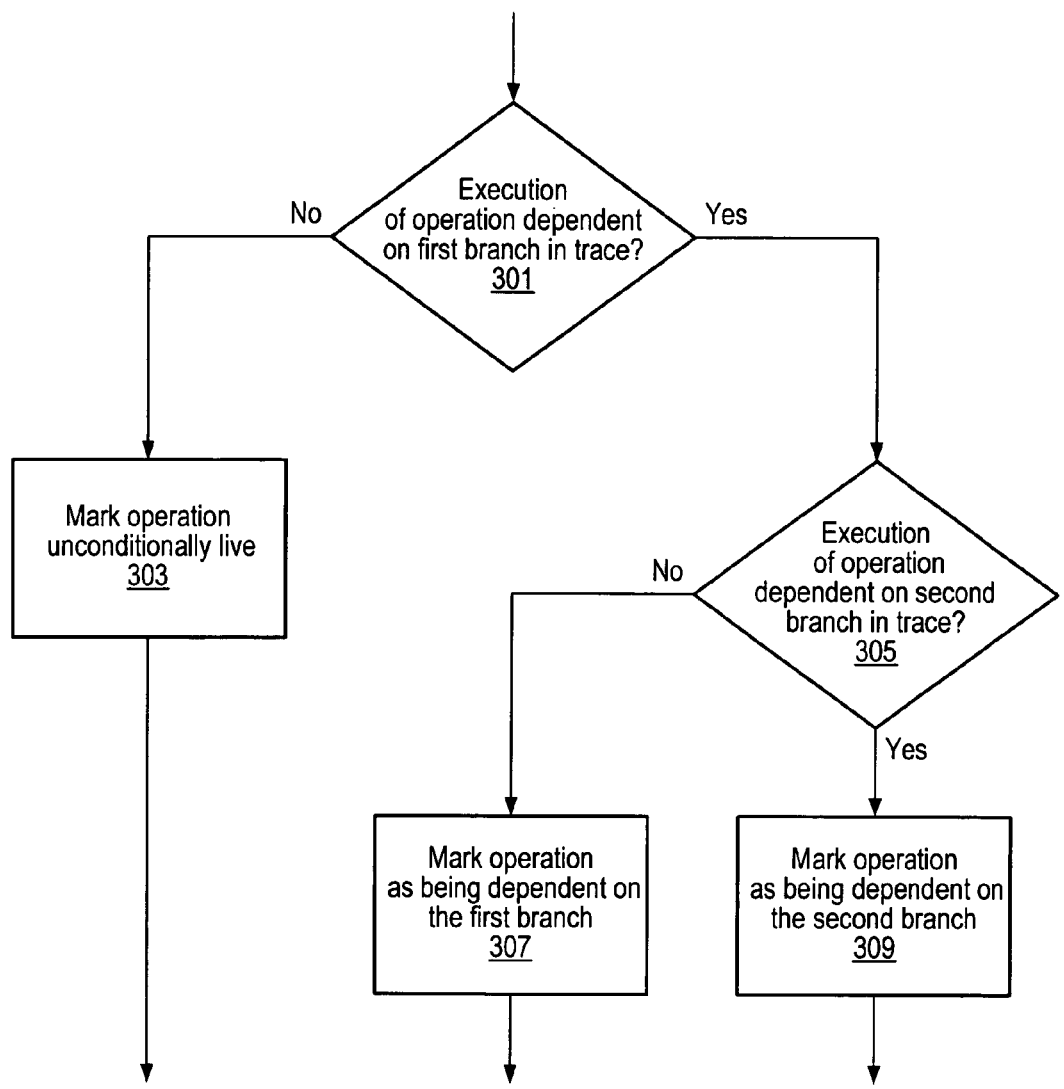
FIG. 3 is a flowchart illustrating a method of generating liveness encodings, according to one embodiment.

FIG. 3 is a flow chart illustrating one embodiment of a method that may be used to generate the liveness encoding for each operation within a trace. If execution of the operation does not depend on the first conditional branch (i.e., if the operation occurs earlier than the first conditional branch in program order or if the operation is the first conditional branch), then the operation may be marked as an unconditionally live operation within the trace cache entry, as shown at 301 and 303.

If execution of the operation is dependent on the first conditional branch but not on the second conditional branch (if any) in the trace, then the operation may be identified as being dependent on the first conditional branch, as shown at 305 and 307. If the operation is dependent on both the first and the second conditional branches, the operation may be identified as being dependent on the second conditional branch, as indicated at 305 and 309. If more basic blocks may be stored within a trace, additional liveness indications (e.g., conditioned on the third conditional branch, etc.) may be generated and stored with the appropriate operations in the trace cache.

Looking back at FIG. 1, dispatch unit 104 may be configured to use the liveness indications 266 included in each operation storage unit 166 to determine which operations should be dispatched to scheduler(s) 118 for subsequent issue to execution core(s) 124 each time the operations included in a trace cache entry 162 are loaded into dispatch unit 104 from trace cache 160. Dispatch unit 104 may use a current branch prediction from branch prediction unit 132 for each branch operation included in the trace in conjunction with the liveness indications to determine which operations should be dispatched for subsequent issue. Alternatively, dispatch unit 104 may dispatch each operation included in the trace but also identify each operation as being executable or not executable dependent on the liveness indication and current conditional branch prediction. In such embodiments, scheduler 118 may maintain an indication as to whether each operation is executable within scheduler 118. Scheduler 118 may be configured to only issue operations that are identified as being executable to execution core 124.

Figure 4:
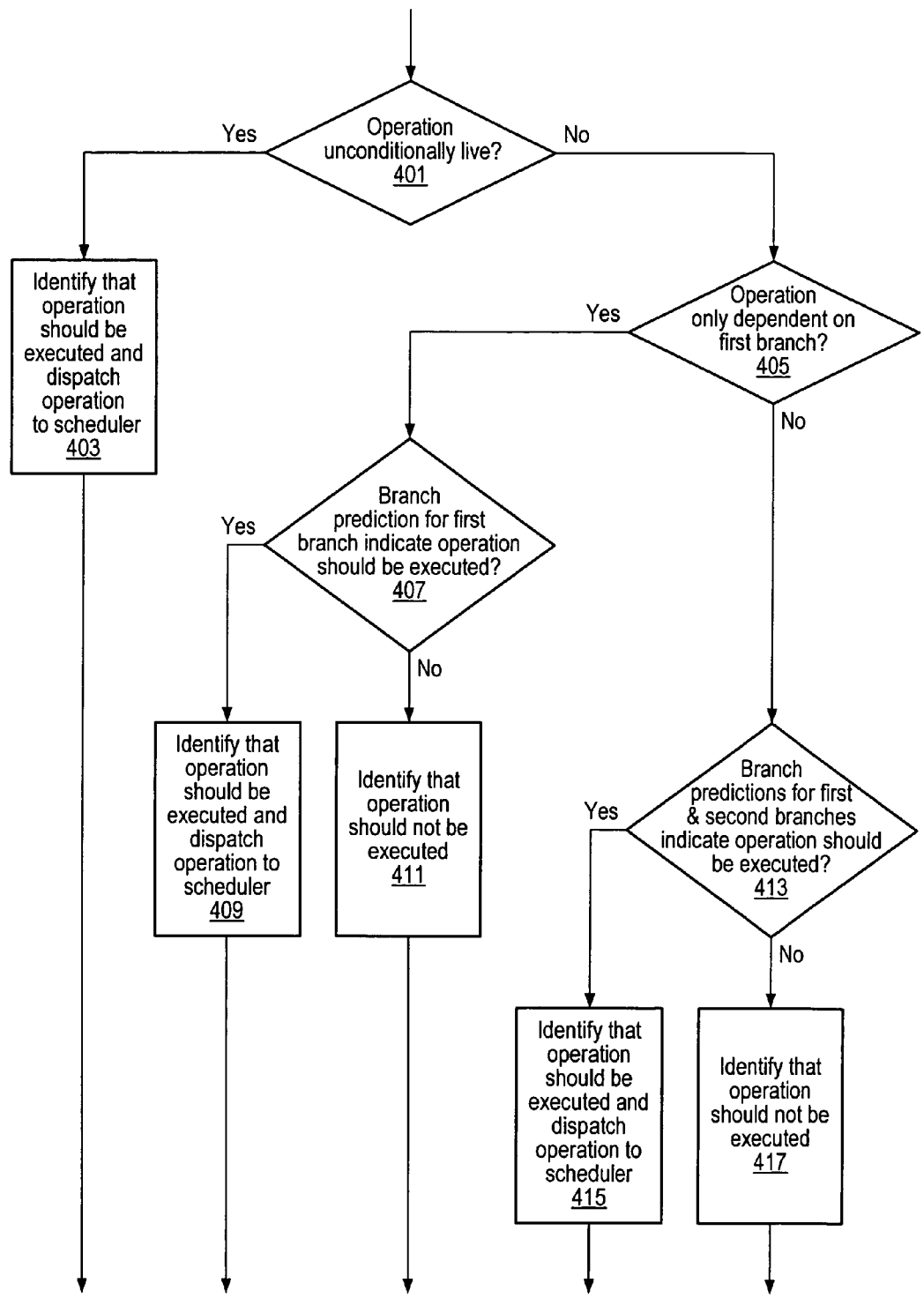
FIG. 4 is a flowchart of a method of using liveness encodings and branch predictions to determine which operations should be executed, according to one embodiment.

FIG. 4 illustrates one embodiment of a method of determining whether an operation included in a trace is executable. If the operation is unconditionally live (i.e., the operation is part of the first basic block within the trace), the operation may be identified as being executable and dispatched to the scheduler, as indicated at 401 and 403. Additionally, in some embodiments, the operation may be marked within the scheduler as an operation to be executed. Marking the operation as executable may allow the scheduler to store both operations that are executable and operations that are not currently identified as executable (e.g., based on a current conditional branch prediction). In such an embodiment, the dispatch unit 104 may provide a signal to the scheduler 118 when the operation is dispatched to indicate that the operation should be marked executable within the scheduler. Note that identifying an operation within a scheduler as executable, which is based on a conditional branch prediction, differs from identifying an operation within the scheduler ready to issue, which is based on operand availability for that operation.

If the operation is only dependent on the first conditional branch (as indicated by the operation's liveness indication) and the branch prediction for the first conditional branch operation indicates that the operation should be executed, the operation may be identified as being executable and dispatched to the scheduler, as shown at 405, 407, and 409. As above, the operation may also be marked within the scheduler as being executable in some embodiments. If instead the branch prediction indicates that the operation should not be executed (e.g., if the current branch prediction differs from the predicted outcome of the first branch at the time the trace was created), the operation may be identified as being non-executable, as indicated at 407 and 411. In one embodiment, the dispatch unit may not dispatch an operation to the scheduler in response to identifying an operation as non-executable. In other embodiments, the dispatch unit may dispatch operations identified as non-executable but may also generate a signal indicating that the operation is non-executable when the operation is dispatched. In response to the signal, the scheduler may mark the operation as non-executable.

If the operation is dependent on both the first conditional branch and the second conditional branch (as determined at 405 by examining the operation's liveness indication), the current branch predictions for the first and second conditional branches may be examined at 413 in order to determine whether the operation is executable. If both branch predictions indicate that the operation should be executed (e.g., the current branch predictions are the same as the branch predictions when the operation's trace was created), the operation may be identified as executable and dispatched to the scheduler, as indicated at 415. Dispatching the operation to the scheduler may, in some embodiments, involve generating a signal indicating that the operation is executable so that the scheduler can mark the operation as being executable. If the current branch predictions indicate that the operation should not be executed, the operation may be identified as being non-executable at 417.

Returning to FIG. 1, note in some embodiments, operations that dispatch unit 104 identifies as non-executable based on one or more branch predictions and the operations' liveness indications may also be dispatched to scheduler(s) 118. However, these operations may be marked within the scheduler as being non-executable. Accordingly, entries within each scheduler 118 may each include storage for an "executable" indication that indicates whether the operation stored within that entry should be issued to one of execution core(s) 124 or not. Scheduler(s) 118 may be configured to store non-executable operations until all of the executable operations within that trace are retired. Operations within the same trace may also be identified within the scheduler. The scheduler 118 may be configured to retire the operations within a particular trace in response to all operations within that trace that are marked as being executable having successfully executed. When the executable operations are retired, scheduler 118 may deallocate scheduler entries allocated to those operations. Additionally, scheduler 118 may also deallocate scheduler entries allocated to the operations within that trace that are identified as being non-executable.

If a branch prediction used to determine that a liveness group was non-executable turns out to be incorrect, the branch prediction unit 132 (or the scheduler 118 itself) may update the executable indications within scheduler(s) 118 to indicate that the liveness group is now executable. Any operations executed or executing in the mispredicted path may be flushed from the processing pipeline and their results may be discarded. Since the operations in the correct path (e.g., any operations marked non-executable) may already be stored within scheduler 118, the scheduler may begin issuing those operations as soon as their executable indications are updated. Accordingly, branch misprediction recovery may take fewer cycles than if the operations in the correct path were fetched from trace cache 160 or instruction cache 106.

Figure 5:
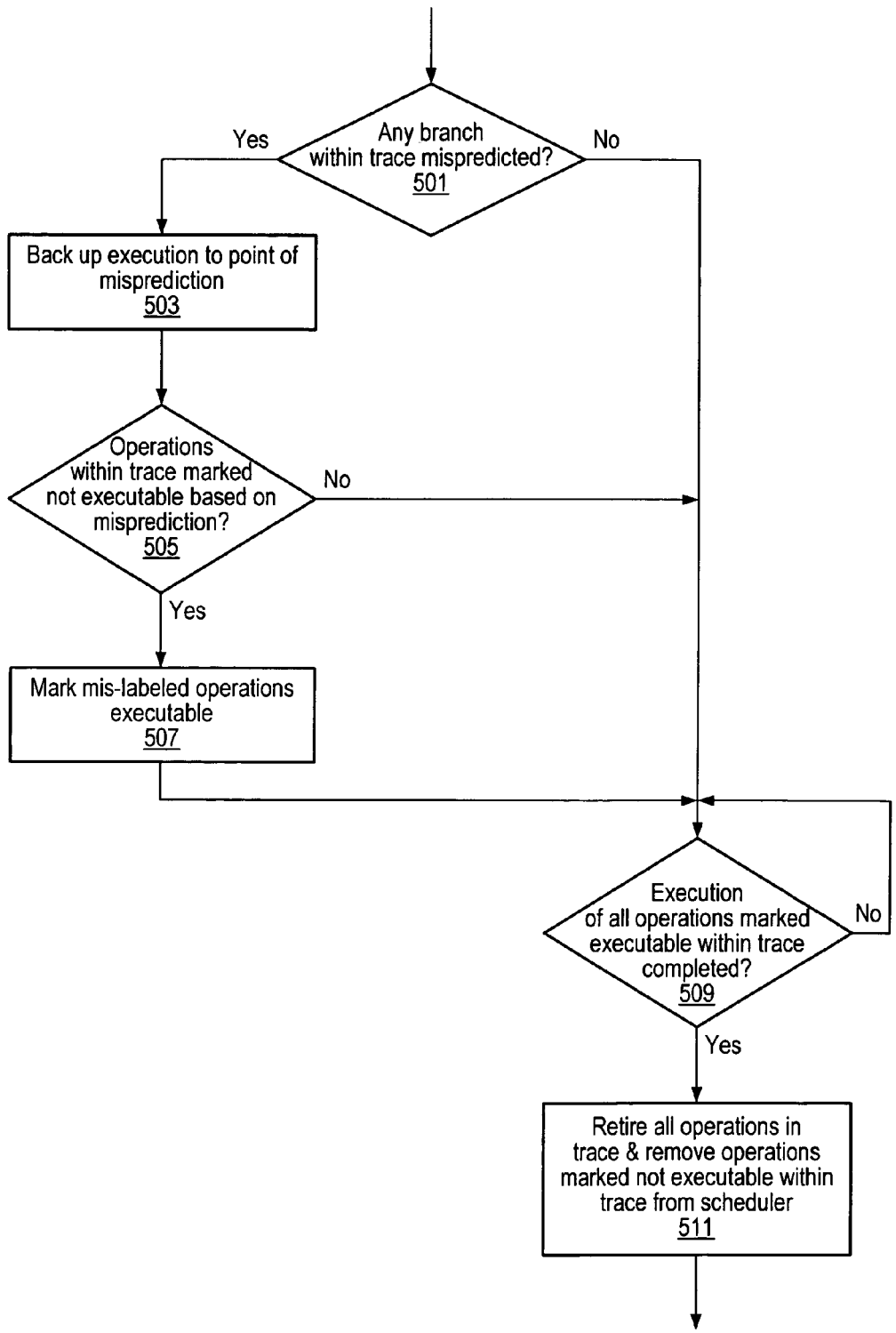
FIG. 5 is a flowchart of a method of executing operations within a trace, according to one embodiment.

FIG. 5 illustrates one embodiment of a method of using the executable indications to recover from a branch misprediction. If any branch within a dispatched trace is discovered to be mispredicted, as determined at 501, execution may be backed up to the point at which the misprediction was made, as shown at 503. If any operations within the same trace as the mispredicted branch instruction were identified as being not executable within the scheduler due to the misprediction, these operations may be relabeled as executable instructions, as indicated at 507. The relabeled instructions may then be issued for execution.

Once all of the operations marked executable within the trace have been executed, the operations may be retired, as indicated at 509–511. Any operations included in the trace that were identified as being not executable may be removed from the scheduler. If no branch mispredictions were encountered during execution of the trace, the operations retired at 509 may be the same operations that were identified as being executable upon dispatch of the trace. If any branch mispredictions were encountered at 501, the operations retired at 509 may include operations that were originally marked non-executable but updated at 507 in response to detection of the misprediction.

Thus, in embodiments where all operations within a trace, whether determined to be executable or not at dispatch, are kept in the scheduler until all operations in the trace have executed, the operations along the correct path may already be stored inside the scheduler when a misprediction is detected. Accordingly, branch misprediction recovery time may be less than if operations along the correct path have to be fetched from the instruction cache.

Dispatch unit 104 may additionally use liveness groups to determine the physical register assignments to make for operations in the trace. For example, operations within the same liveness group may have the same register assignments for register renaming purposes (e.g., as the result of performing of slotification and/or other transformations on operations within that liveness group). For example, if one operation stores a result to a R1 based on a calculation performed on R1 and R3, and if another operation in the same liveness group performs a calculation based on R1, the same register assignment may be used for both occurrences of the R1 source operand. A different physical register may be assigned to store the result R1 generated by the first operation. An operation in the next liveness group in the trace that uses R1 as a source operand may use the same register assignment as was used for the result R1 calculated by the first operation in the previous liveness group. Thus, depending on the liveness group in which a particular operation is included, the dispatch unit 104 may determine which register assignments to perform for that operation.

Liveness indications may also be used by a trace generator 170 to reduce ordering constraints between operations when those operations are stored in traces. For example, as discussed in more detail below, operations within the same liveness group may be reordered, combined, or even eliminated by performing transformations.

Transforming Operations Prior to Storage in Trace Cache

Figure 6:
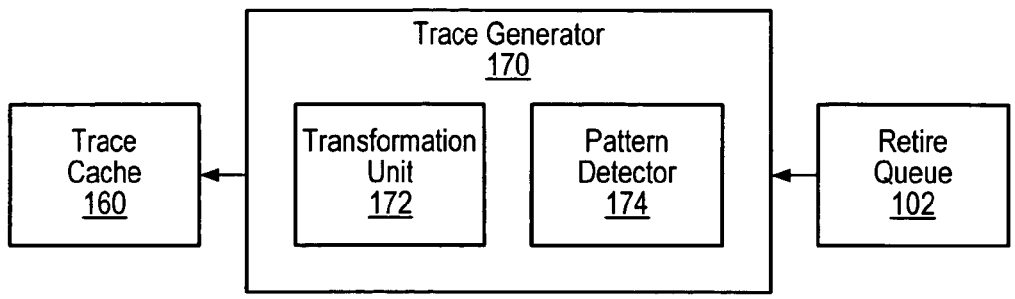
FIG. 6 illustrates a microprocessor that includes a trace generator, according to one embodiment.

FIG. 6 illustrates one embodiment of a microprocessor that includes a retire queue 102, a trace generator 170, and a trace cache 160. Trace generator 170 includes a pattern detector 174 and a transformation unit 172. Trace generator 170 may be configured to receive basic blocks of retired operations from retire queue 102 and to store those basic blocks within traces in trace cache 160. Note that in alternative embodiments, trace generator 170 may be coupled to the front-end of the microprocessor (e.g., before or after the dispatch unit) and configured to generate traces from basic blocks detected within the pipeline at that point within the microprocessor.

Pattern detector 174 is configured to detect operation and/or operand patterns within each basic block received by the trace generator 170. Many patterns involve two or more operations, and thus pattern detector 174 may operate by comparing operands, addressing information, and/or opcodes for several operations. Pattern detector 174 may be configured to detect multiple different patterns within groups of operations (e.g., within operations included in the same basic block) and to generate one or more signals identifying each detected pattern. Pattern-detector 174 may also be configured to detect multiple different patterns across basic block boundaries by using and manipulating the liveness groupings. Transformation unit 172 may receive the signals from pattern detector 174 and responsively perform one or more transformations on one or more operations. The transformed operation(s) may then be stored within a trace in trace cache 160.

Pattern detector 174 may be configured to detect a variety of different patterns. Accordingly, transformation unit 172 may also be configured to perform a variety of different transformations. For example, transformation unit 172 may be configured to transform one or more operations in response to pattern detector 174 detecting patterns identifying those operations as candidates for constant propagation. Similarly, pattern detector 174 may detect patterns identifying some operations as candidates for move renaming transformations, dead operation elimination, branch folding and/or other transformations. Transformation unit 172 may transform the operations accordingly in response to detection of the respective patterns.

The transformations performed on the operations in a trace by transformation unit 172 may be such that the transformed operations may issue earlier (e.g., the transformations may improve the dataflow between operations) and/or are stored more efficiently within a trace cache entry 162. For example, in embodiments that support instruction sets such as the x86 instruction set, in which many instructions are decoded into several component operations before dispatch, inefficiencies may arise between the component operations included within different instructions in the same basic block. While these inefficiencies may be detected and compensated for in dispatch unit 104, doing so may increase the number of pipeline stages and/or increase the amount of time taken in the dispatch pipeline stage. Accordingly, it may be undesirable to perform many optimizations at that stage of the pipeline. In contrast, in many embodiments the trace cache generator 170 may be located at the back-end of the microprocessor pipeline. Taking more time to generate traces may not have a significant detrimental effect on the main processing pipeline. Accordingly, performing additional optimizations on operations within trace generator 170 may be more efficient and desirable than optimizing the operations at the front-end in the dispatch unit 104.

Note that many of the transformations may be performed on operations within the same basic block. For example, if instructions are decoded into several operations by dispatch unit 104, the pattern detector 174 may detect patterns within the operations included in the same basic block and even within operations that are components of the same instruction. This may allow the transformation unit 172 to perform optimizations that correct for inefficiencies that result when complicated instructions (such as x86 instructions) are decoded into multiple operations.

In many embodiments, a given set of operations within a trace may be transformed multiple times. For example, the first time the operations are input to the pattern detector 174, the pattern detector 174 may identify the operations as candidates for constant propagation. In response, transformation unit 172 may transform the identified operations. The transformed operations and the other operations within the trace may then be re-input to pattern detector 174. As a result of the transformation, pattern detector 174 may detect additional patterns within the set of operations and responsively identify operations that are candidates for additional transformations (e.g., dead operation elimination). The operations within a trace may be stored in a final form within a trace cache entry if the operations are input to the pattern detector 174 and no operations are responsively identified as transformation candidates. In some embodiments, however, trace generator 170 may limit the number of times operations within a given trace can be transformed before being stored in final form within trace cache 160. Additionally, in some embodiments, pattern detector 174 may be configured to identify operations that are candidates for a series of transformations in a single pass through the pattern detector.

Figure 7A:
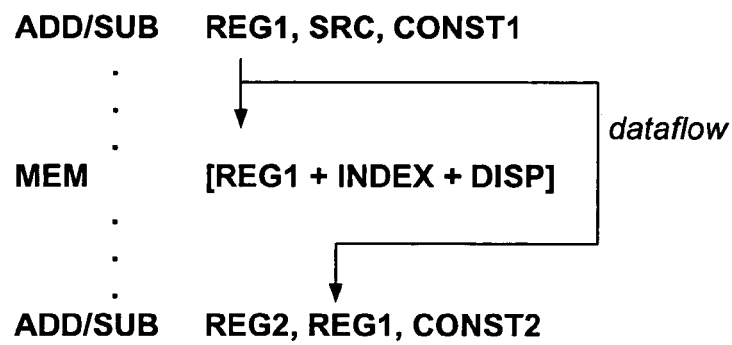
FIG. 7A illustrates an exemplary set of operations that include candidates for a constant propagation transformation, according to one embodiment.

FIG. 7A illustrates how candidate operations for constant propagation transformations may be detected by pattern detector 174, according to one embodiment. A first addition or subtraction operation, ADD/SUB REG1, SRC, CONST1, combines an operand SRC and a constant operand CONST1 and stores the result in REG1. Two succeeding operations, MEM [REG1+INDEX+DISP] and ADD/SUB REG2, REG1, CONST2, depend on the result stored in REG1, as indicated by the dataflow arrows. These three operations may be separated by several intervening operations in program order. However, these three operations may be included in the same basic block and/or stored within the same trace.

The dependency of the second and third operations on the result of the first operation affects when the second and third operations may be issued to an execution core 124 relative to when the first operation may be issued. Here, since a source operand of the second and third operations will not be available until the first operation's result is output on result bus 130, the second and third operations may not be issued until the clock cycle in which the first operation's result is available. Accordingly, the second and third operations cannot be issued before the first operation.

When the operations are input to trace generator 170 (e.g., by retire queue 102), pattern detector 174 may detect that one of the source operands CONST1 for the first operation is a constant value. Pattern detector 174 may also detect the dependency of the second and third operations on the first operation by comparing the result operand identifier REG1 of the first operation to the source operand identifiers of the second and third operations. Note that the pattern detector 174 may also compare the result operand identifier REG1 to one or more other operations' source operand identifiers. In response to detecting these patterns, pattern detector 174 may generate one or more signals indicating that candidate operations for constant propagation have been detected and identifying the candidate operations.

Figure 7B:
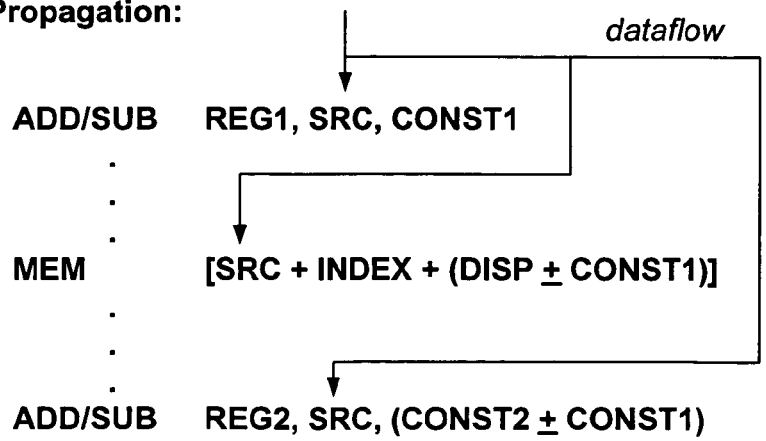
FIG. 7B illustrates the operations of FIG. 7A after performance of a constant propagation transformation, according to one embodiment.

FIG. 7B shows how the candidate operations identified in FIG. 7 may be transformed by transformation unit 172, according to one embodiment. In response to the pattern detector detecting and identifying candidate operations for constant propagation transformation, transformation unit 172 may modify the second and third operations that are dependent on REG1 to instead depend on the sum of the source operands of the first operation, as shown in FIG. 7B. Thus, the source operand REG1 has been replaced with a source operand SRC+/−CONST1. Then CONST1 may be regrouped with DISP so that two constants can be reduced to one constant. The transformation unit 172 may select whether to add or subtract CONST1 from SRC dependent on whether the first operation is an add or subtract operation.

Once the second and third operations have been transformed as shown in FIG. 7B, the dataflow graph is changed such that the second and third operations no longer depend on the result of the first operation. In other words, the dataflow depth of the second and third operations is reduced, allowing those operations to enter execution earlier. Accordingly, the second and third operations may be issued as soon as the first operation's operand SRC is available (e.g., on result bus 130 or in register file 116). Now, the transformed second and third operations may be issued to an execution core without waiting for the first operation to be issued. One or both of the second and third operations may even be issued before the first operation in some circumstances. By transforming the operations in such a way that the dataflow graph contains fewer dependencies, potential stalls may be removed from the processing pipeline. Furthermore, the original ADD/SUB may become a candidate for dead operation elimination if a subsequent operation also writes REG1.

Note that while the above example describes constant propagation in the context of addition, subtraction, and memory reference operations, constant propagation may be performed for other types of operations as well in many embodiments.

FIG. 8A shows how pattern detector 174 may detect one or more operations that are candidates for move renaming transformations, according to one embodiment. Here, two operations, which may be separated by one or more intervening operations in program order, are related in that one of the source operands EAX of the second operation ADD EAX, EAX, 7 is dependent on the result of the first operation MOV EAX, ESI. Pattern detector 174 may detect that the first operation is a MOV operation that moves a value from one logical register ESI to another logical register EAX. Pattern detector 174 may also compare the source operands of the second operation to the result operand of the first operation. Pattern detector 174 may additionally detect that none of the intervening operations depend on the result of the first operation. In response to these detections, the pattern detector 174 may generate signals identifying the first and second operations as candidates for move renaming.

FIG. 8B illustrates how transformation unit 172 may transform the second operation in response to the pattern detector 174 identifying the first and second operations as candidates for move renaming. The move renaming transformation replaces a source operand identifier that matches the result operand identifier of an earlier operation with a source operand identifier of the earlier operation. Since none of the intervening operations depend on the result of the MOV operation, the move renaming transformation eliminates the first operation and replaces the source operand EAX of the ADD operation with the source operation ESI of the move operation. Additionally, if any of the operations between the MOV operation and the ADD operation depend on the value of EAX, those operations' source operand identifiers specifying EAX may be modified to instead identify ESI.

The transformed ADD operation may be stored in a single operation storage location 166 within a trace cache entry 162, as opposed to the two operations storage locations that would be required to store both the MOV and the ADD. Accordingly, by performing move renaming transformations, trace size may be reduced and operations may be more efficiently stored within the trace cache 160 (and within scheduler 118 if the trace is subsequently dispatched). Additionally, the transformed operation may be issued as soon as its operands are available. Prior to the transformation, issue of the second operation was dependent on the execution of the first operation. Accordingly, operation issue may also be improved by performing move renaming transformations.

FIG. 9A illustrates another example of how pattern detector 174 may detect candidates for move renaming transformations, according to one embodiment. Here, the pattern detector 174 may identify three operations as candidates for move renaming based on the type of each operation and/or the result and/or source operands of each operation. The result operand EAX of a first operation, ADD EAX, EAX, ESI, provides one of the source operands for a second operation, MOV EDI, EAX. A third operation, ADD EAX, EBX, 2, destroys the result operand of the first operation by overwriting the logical register in which that result operand is stored. Pattern detector 174 may detect the relationship between the operands of each operation by comparing the result and source operand identifiers for each operation. Based on the same type of comparisons with other intervening operations, pattern detector 174 may determine that intervening operations (if any) between the second and third operation do not depend on the result of the second operation. In response to these detections, pattern detector 174 may generate signals identifying the three operations and indicating that the first and second operations are candidates for move renaming. Note that if any operations subsequent to ADD EAX, EAX, ESI and prior to MOV EDI, EAX depend on the value of EDI, the pattern detector 174 may not identify these operations as candidates for move renaming.

FIG. 9B provides an example of how transformation unit 172 may perform a move renaming transformation on the first and second operations in response to the pattern detector 174 identifying those operations as move renaming candidates. Here, the move renaming operation combines the first and second operations by replacing the result operand identifier of the first operation with the result operand identifier of the second operation. As a result, the ADD EDI, EAX, ESI operation effectively performs the move operation by directly storing the result of the ADD in EDI. Since no operations depend on the result value of the ADD being stored in EAX, this transformation does not disrupt any data dependencies and the second operation is no longer needed. Note that if any operations between ADD EAX, EAX, ESI and MOV EDI, EAX depend on the value of EAX, those operations' source operand identifiers specifying EAX may be modified to instead identify EDI.

FIG. 10A illustrates one example of how pattern detector 174 may detect operations that are candidates for dead operation elimination transformation. Dead operation elimination removes operations whose results are no longer consumed by any other operations (as determined by examining a finite range of operations). In this example, a second subtract operation depends on the result of an earlier subtract operation. Both operations' operands are identified by the same operand identifiers. Operations like these often arise as a result of decoding several stack instructions (e.g., PUSH and POP instructions) that store or remove a value from the stack and modify the value of the stack pointer SP by a constant displacement. The result of each individual subtract operation may be used in address generation for a corresponding MOV operation that stores or removes a value from the stack dependent on the current value of SP. However, constant propagation transformations like the one described above may be performed on the MOV operations to remove the dependencies on the individual subtract operations. Due to the constant propagation transformations, the individual results of each subtract operation may no longer be needed by any operation other than the next subtraction operation (e.g., as determined by the pattern detector 174 examining the source operand identifiers of a certain number of subsequent operations and/or detecting a subsequent operation that destroys the value of SP generated by the subtract operation).

Note that the specific types of operation (e.g., ADD) shown herein are exemplary and that similar techniques may be used to identify candidates for move renaming among other types of operations.

FIGS. 10B–10D illustrate exemplary transformations that may be performed on the operations identified as transformation candidates in FIG. 10A by transformation unit 172. In FIG. 10B, a slotification transformation is performed on the two subtract operations. The slotification transformation replaces the result operand identifier of the first operation and the source operand identifier of the second operation with a temporary operation identifier, temp. This explicitly identifies the dependency between the two operations while also distinguishing the various different values of the SP register in each operation. A slotification transformation may be performed in order to set up one or more additional transformations.

FIG. 10C illustrates a constant propagation transformation that may be performed in response to the slotification transformation of FIG. 10B. Here, the second subtraction operation's source operand, temp, is replaced with the source operand of the first operation, SP, modified by the constant displacement 4 (instead of being modified to SSUB SP, (SP-4), 4, the transformed operation is SUB SP, SP, 8 in this example). By transforming the second operation, the second operation is no longer dependent on the first operation and may be issued before execution of the first operation.

FIG. 10D illustrates how a dead operation removal transformation may be performed on the first operation subsequent to performance of the constant value propagation transformation of FIG. 10C. Assuming none of the intervening operations between the first and second operations of FIG. 10C depend on the value of temp generated by the first operation, the first operation's result is no longer consumed by another other operations once the second operation is transformed to no longer depend on the first operation. Accordingly, the first operation may be removed without affecting the overall correctness of the operation stream. Pattern detector 174 may detect these conditions and notify transformation unit 172. Transformation unit 172 may remove the first operation in response to pattern detector 174 identifying the first operation as a candidate for dead operation removal.

Note that the transformations illustrates in FIGS. 10B–10D may be performed during one pass through the transformation unit 172 in some embodiments. In other embodiments, each transformation may be performed in a different pass through the transformation generator 172. After each transformation, the operations in a trace, including the transformed operations, may be re-input to the pattern detector 174, which may in turn identify the transformed operations as candidates for the next transformation.

FIG. 11A illustrates how pattern detector 174 may detect operations that are candidates for branch folding transformations. Branch folding transformations irrevocably join a conditional branch operation and the operation that generates the result on which the conditional branch is conditioned. In FIG. 11A, a first operation Op1 sets a value in a condition code register. A subsequent conditional branch operation, JNE (Jump if Not Equal) is conditioned on the value in the condition code register. Intervening operations do not affect the value of the condition code register on which the conditional branch operation depends. Pattern detector 174 may identify the two operations shown in FIG. 1A as candidates for a branch folding transformation in response to identifying Opt as an operation that sets a condition code value (e.g., by examining Op1's opcode) and JNE as an operation that depends on the condition code value set by Op1 (e.g., by examining the opcode for the JNE operation).

FIG. 11B shows how transformation unit 173 may perform a branch folding transformation on the operations of FIG. 11A. In response to the pattern detector 174 identifying the operations as candidates for a branch folding transformation, the transformation unit 173 may encode the branch in the flow control information associated with Op1's liveness group within a trace cache entry. Note that the liveness grouping of Op1 uniquely denotes the recovery target label of the branch. Op1 may then be identified as a branch operation. Since the two operations are combined into a single operation, more space is available within the trace cache entry to store other operations. Additionally, since the transformed operation may be dispatched and scheduled as a single operation, the operation may be processed more quickly. The transformed operation may also be executed in fewer cycles than the two separate operations could be executed. Note that any intervening operations that occur between Op1 and JNE may be identified as being part of the same liveness group as Op1, since execution of those operations is not dependent on the outcome of the JNE operation.

Figure 12:
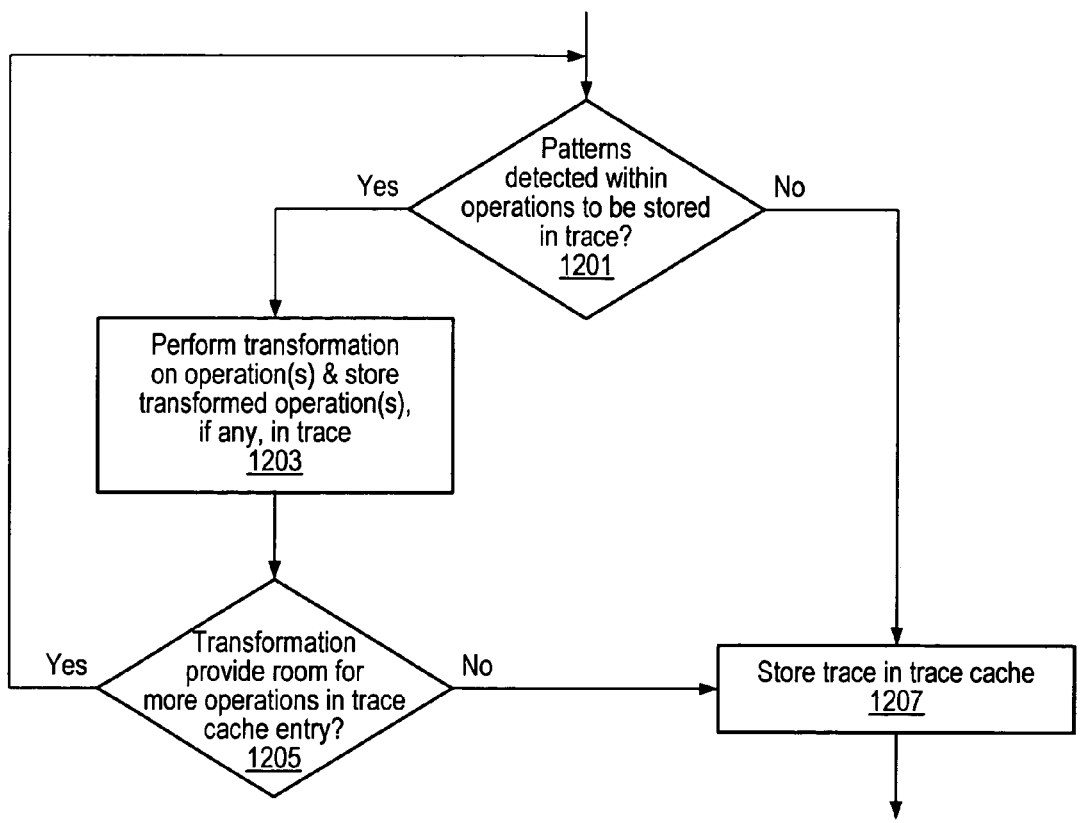
FIG. 12 illustrates one embodiment of a method of generating a trace for storage within a trace cache entry.

FIG. 12 illustrates one embodiment of a method of generating a trace for storage within a trace cache entry. At 1201, the operations to be stored within a trace are examined to determine whether any patterns identifying operations as candidates for transformations are present. The operations may be examined by detecting certain opcodes and/or comparing various operand identifiers in one or more operations. If any patterns identifying one or more operations as transformation candidates are detected at 1201, the operation(s) may be transformed and the transformed operations, if any, may be stored within a trace cache entry in a trace cache. Note that some transformations may effectively eliminate one or more operations, either by modifying other operations to include the functionality of the eliminated operation or by removing operations whose results are no longer consumed by any other operations within a finite range of operation.

The transformations that are performed may often be performed on operations within the same basic block or liveness group. For example, the opportunity to perform these operations may arise due to complicated instructions being decoded into several less complex operations. The transformations may include transformations that combine, rearrange, and/or minimize the number and/or type of these operations. Note that transformations other than the exemplary transformations described above may be performed in other embodiments.

Note that in many embodiments, various operations may be identified as candidates for various transformations at 1201. In other words, candidates for more than one type of transformation may be identified at substantially the same time. Similarly, more than one type of transformation may be performed at substantially the same time in some embodiments at 1203. Note that other embodiments may serialize the detection and/or transformation of operations. Additionally, in some embodiments, if one operation is a candidate for more than one type of transformation, the transformations may be applied sequentially to that operation.

If the transformation provides room for more operations in the trace, as determined at 1205, the new set of operations to be stored in the trace may be examined for patterns at 1201. Additionally, in some embodiments, the post-transformation set of operations may be reexamined to determine whether the transformation has revealed other patterns within the set of operations, even if the set of operations is still as large as it was prior to performance of the transformation at 1203. For example, in one embodiment, a set of operations may be reexamined after each transformation until examining the operations detects no patterns. Once the operations to be stored within the trace are finalized, the operations may be stored within a trace at 1207. Functions 1201–1207 may then be repeated for another set of operations.

Microcode Traces

Figures 13A, 13B:
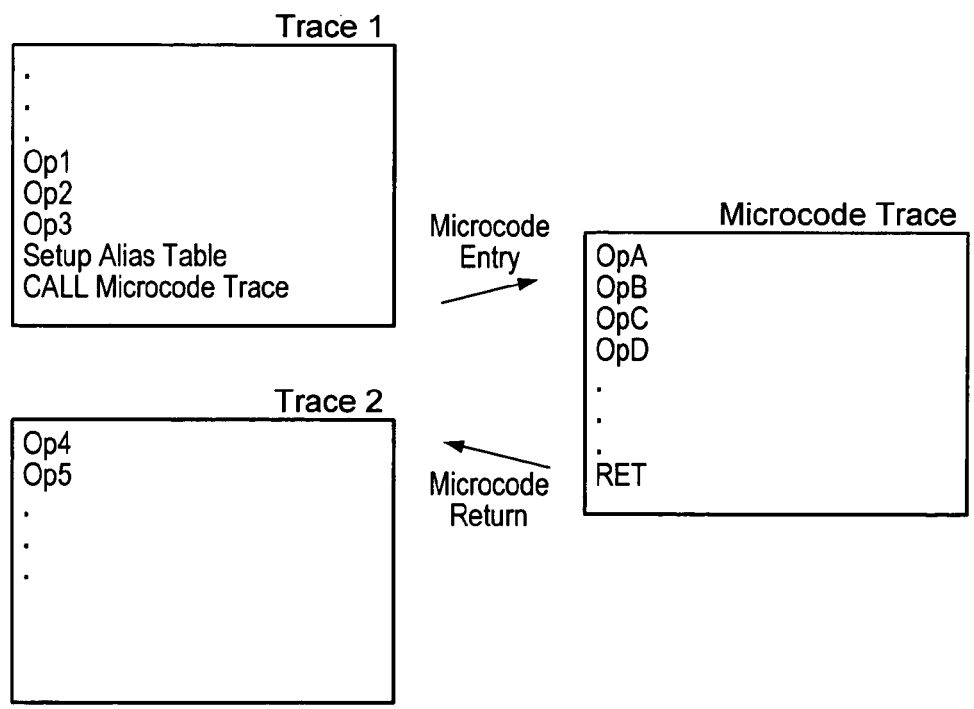
FIG. 13A illustrates how one or more microcoded instructions may be included within an instruction stream received by a microprocessor, according to one embodiment.
FIG. 13B illustrates the traces that may be generated from the instruction stream of FIG. 13A, according to one embodiment.

FIG. 13A illustrates how one or more microcoded instructions may be included within the instruction stream received by dispatch unit 104. Here, a microcoded instruction is included between instructions 3 and 4. Non-microcoded instructions 1–6 may be directly decoded into one or more component operations by decode unit 140. The operations may also be combined into one or more traces (e.g., after the operations are retired). In contrast, the microcode instruction may require additional handling by a specialized microcode unit 150 in order to be decoded and/or executed.

FIG. 13B illustrates the traces that may be generated from the instruction stream of FIG. 13A. FIG. 13B also illustrates how the microcode operations corresponding to the microcoded instruction of FIG. 13A may be implemented in a microcode trace. An alias table setup operation and a microcode subroutine call operation, CALL, are inserted into the execution stream after the operations decoded from instruction 3 and before the operations decoded from instruction 4. A microcode subroutine call operation may include the same opcode as a non-microcode-subroutine call operation in many embodiments. For brevity, both types of operations are referred to herein as call operations.

The call operation CALL identifies the entry point of a microcode subroutine that includes the microcode operations used to implement the microcoded instruction of FIG. 13A. The call operation is included as the final operation in the Trace 1. In some embodiments, either or both of the microcode call operation and the alias table setup operation may be combined and/or eliminated when an associated trace is created for storage in the trace cache. For example, the microcode call operation may be combined with the alias table setup operation and the target-label identifying the entry point of the microcode subroutine may be stored as part of the flow control information associated with the trace in which the alias table setup operation is stored. Note that the microcode operations in the microcode subroutine are not stored within a trace within trace cache 160. Instead, the microcode operations may be stored within a ROM included in and/or coupled to decode unit 150.

Unlike in typical microcode entry point generation in prior art systems, the alias table setup operation is inserted into the execution stream. The alias table setup operation provides one or more register names from the original microcoded instruction for use as replacement register names within the microcode subroutine. In response to handling the alias table setup operation, the dispatch unit 104 may allocate an alias table to store the replacement register names for use within the microcode subroutine. In some embodiments, the alias table setup operation may also store one or more operands, constants, displacements, etc., into various hidden microprocessor storage useable by the microcode subroutine.

Execution of the call operation may push a return address (e.g., an address identifying the first operation in the second trace, as identified by a microcode return label) onto a stack (e.g., in a hidden microprocessor storage area) and transfer control to the microcode operations implementing the microcoded instruction. In this example, the return address is the address of Instruction 4.

The microcode trace includes the microcode operations for the microcoded instruction of FIG. 13A. The final operation in the microcode trace is a return operation, RET, that is used to return control to the next instruction to be executed after the microcoded instruction. Execution of the return operation pops a return address from the stack in the hidden microprocessor storage area. The return address, saved when the call operation of Trace 1 is executed, identifies the next trace, Trace 2 (or the next instruction, Inst. 4), to be executed.

Note that in some embodiments, a microcode subroutine may include more than one microcode trace. In such embodiments, flow control information in each microcode trace may identify the next microcode trace to be executed. The final operation of the final microcode trace may be the return Operation used to identify the next trace in trace cache 160 (or the next instruction in instruction cache 106) to be executed. Alternatively, some embodiments may not store microcode subroutines in trace format.

Figure 13C:
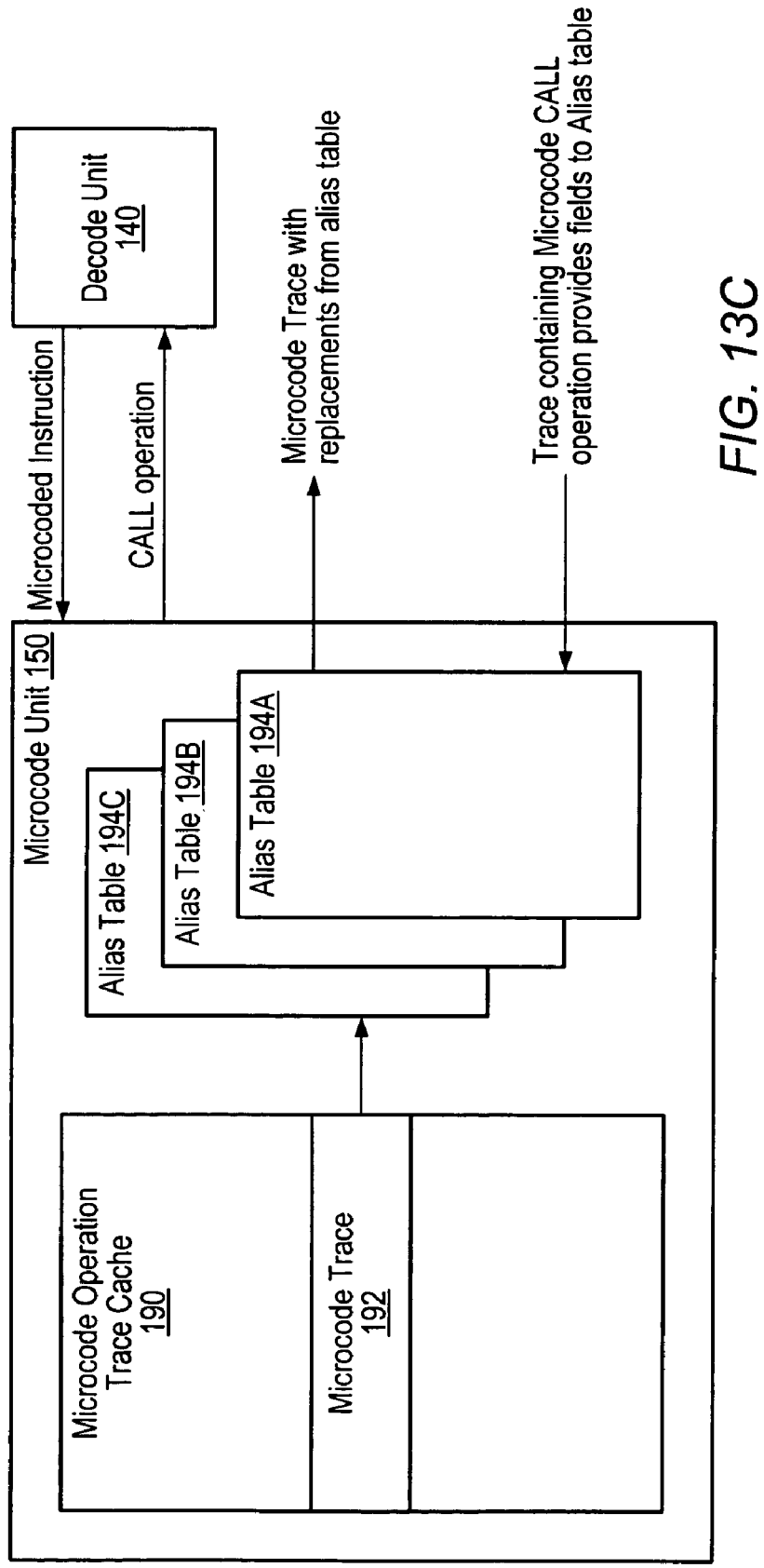
FIG. 13C shows a microcode unit, according to one embodiment.

FIG. 13C shows one embodiment of a microcode unit 150. When a microcoded instruction is received by dispatch unit 104, the dispatch unit 104 may insert the appropriate microcode call operation and alias table setup operation into the execution stream. The decode unit 140 may then transfer control to the microcode unit 150, allowing the microcode unit to dispatch the appropriate microcode operations included in the microcode subroutine. While the control transfer is taking place, the dispatch unit 140 may setup an alias table with register name replacements in accordance with the alias table setup operation.

The dispatch unit 104 may access a lookup table each time a microcoded instruction is received to determine which tag corresponds to that microcoded instruction. The tag may identify the entry point of a microcode subroutine that includes the operations that implement the corresponding microcoded instruction. In one embodiment, the microcode subroutine may be stored in one or more microcode traces 192 within a microcode trace cache 190 within the microcode unit 150. Accordingly, the tag may identify the first microcode trace within the microcode subroutine. The microcode unit 150 may include the tag in the call operation inserted into the operation stream.

The microcode unit 150 may dispatch microcode operations included in the microcode subroutine in response to the decode unit 140 receiving the microcoded instruction. Prior to dispatching the microcode operations, the microcode unit 150 may modify the operations according to an alias table element 194. The alias table element 194 may include replacement register names for one or more of the microcode operations included in the microcode subroutine. An alias table element 194 may specify addressing registers such as destination, base, index, scale, displacement, and segment registers. The alias table may also store other register names identifying replacements that should be made within the microcode operations in the associated microcode subroutine. For example, the alias table may indicate an associated source register or immediate value and whether to return a condition code with the final result of the associated microcode subroutine. In some embodiments, the alias table may function similarly to a register renaming map. Microcode may have access to registers not available to normal trace operations.

The target label associated with the call operation is used to identify the microcode subroutine entry point. The target label may be stored in a trace within a trace cache 160. The alias table setup operation specifying the replacement register names may be stored in a trace in trace cache 160. If that trace is subsequently dispatched, dispatch of the operations in the trace may trigger the microcode unit 150 to setup the alias table element 194 for the associated microcode subroutine using the replacement register names stored in the trace and to dispatch at least some of the microcode operations included in the microcode subroutine specified by the call operation. For example, when Trace 1 is input to dispatch unit 104, dispatch unit 104 may use one or more register names (e.g., included in the flow control information storage and/or in the same operation storage as the alias table setup operation) to set up an alias table.

Each time an alias table setup operation is received by dispatch unit 104, a new alias table element 194 may be allocated to store the values associated with the microcode trace call operation. If no alias table storage 194A–194C is available, dispatch of the call operation will stall until a currently-executing microcode trace completes execution and its corresponding alias table element is deallocated. Upon availability of an alias table element, the call operation may be dispatched. Note that while storage for three alias table elements 194A–194C is shown in FIG. 13C, other embodiments may include storage for other numbers of alias table elements.

In response to dispatch unit 104 receiving a trace that includes a microcode subroutine call operation, the operations in the microcode subroutine identified by the call operation may be modified according to an associated alias table and dispatched to scheduler(s) 118.

As mentioned above, microcode operations may be stored in trace format in a trace 192. Like traces in trace cache 160, microcode traces may include one or more branch operations and one or more microcode operations whose execution is dependent on the outcome of a branch also included in the microcode trace. Accordingly, each microcode operation in a microcode trace may, in some embodiments, have an associated liveness indication identifying the liveness group in which that microcode operation belongs. Inclusion of liveness indications may allow microcode operations to be stored out of order within the microcode trace. In other embodiments, operations may be stored in order within a microcode trace and thus the order of operations within the microcode trace may indicate which operations belong in which liveness group.

Microcode operations within a microcode trace may be selectively dispatched based on which liveness group they belong to and on current branch predictions associated with an earlier branch. For example, if a microcode operation is included in the second liveness group within a trace, dispatch of that microcode operation may depend on whether a branch prediction indicates that microcode operation will be executed. Alternatively, all operations within a microcode trace may be dispatched, but certain operations may be identified as being non-issuable (dead) based on a branch prediction and a liveness group indication, as described above.

When a misprediction is detected for a branch included in a microcode subroutine, execution may be backed up to the point of the misprediction and microcode operations subsequent to the point of misprediction may be re-dispatched. If the microcode operations within a particular liveness group within a trace were not dispatched (or, alternatively, were marked as being non-issuable within a scheduler) based on a branch prediction that resolved incorrectly, those microcode operations may be dispatched (or marked executable within the scheduler) upon resolution of the branch operation on which they depend. If the microcode operations were not originally dispatched, the microcode operations may be output from microcode trace cache, passed through the appropriate alias table element, and/or passed through a register renaming map before being dispatched to scheduler 118. Note that in situations where the operations associated with a particular microcoded instruction are included within more than one microcode trace, certain microcode traces may not be dispatched based on branch predictions made for branches included in other microcode traces. If all or part of such a microcode trace is subsequently dispatched due to a branch prediction being incorrect, operations within that microcode trance may be passed through the alias table prior to dispatch to scheduler 118. As these examples show, it may be desirable to keep an alias table allocated to a particular microcoded instruction until all dispatched and/or executable microcode operations associated with that microcoded instruction have successfully completed execution. In particular, it may be desirable to keep an alias table allocated until all branch predictions within an associated microcode subroutine have resolved successfully.

More than one alias table may be maintained in order to allow microcode operations for more than one microcoded instruction to be issued before the first microcoded instruction retires. By retaining the information in an alias table for each microcoded instruction, each set of microcode operations may recover from a branch misprediction within that set of microcode operations. When all of the issued and/or executable microcode operations associated with a particular microcoded instruction complete execution successfully (e.g., when those operations commit within retire queue 102), the alias table storing replacement values for those microcode operations may be deallocated, providing storage for replacement values for another set of microcode operations.

Figure 14:
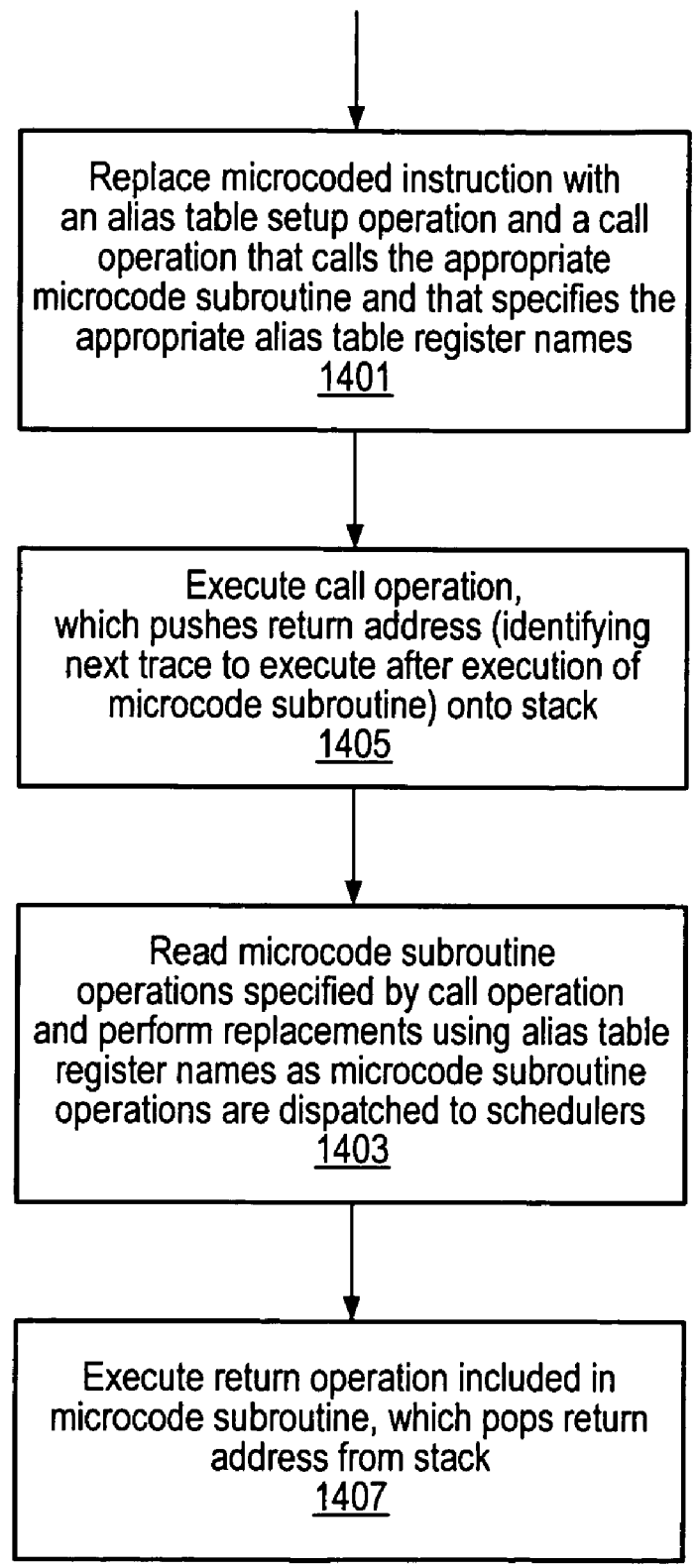
FIG. 14 is a flowchart of one embodiment of a method of processing a group of instructions that includes a microcoded instruction.

FIG. 14 is a flowchart of one embodiment of a method of processing a group of instructions that includes a microcoded instruction. At 1401, a microcoded instruction included in the instruction stream is replaced with a call operation that specifies the entry point of the microcode subroutine and/or with an alias table setup operation that specifies one or more register names to be included in an alias table for the microcode subroutine (note that in some embodiments, these two functions may be implemented by a single operation). The call operation may identify a tag of a microcode trace within a microcode trace cache. This identification may be performed by a lookup table, content-addressable memory, combinatorial logic or any other mechanism for identifying a tag corresponding to the microcoded instruction encoding. For example, microcode traces may be stored in a 3K entry ROM. A microcode unit may map a microcoded instruction encoding to a 12-bit ROM address in the range 0x000–0xBFF according to where the beginning of the microcode routine for that microcoded instruction is located.

At 1405, the call operation may be executed. Execution of the call operation pushes a return address identifying the next instruction to be executed (after execution of the microcode subroutine) onto the CPU storage stack. The call operation used to initiate the microcode subroutine may be stored within a trace in a trace cache. The microcode operations included in the microcode subroutine may not be stored in such a trace cache. Instead, the microcode operations may be stored in an independent storage structure (e.g., in a microcode trace cache 190 implemented on a ROM).

At 1403, the microcode operations included in the microcode subroutine may be retrieved (e.g., from a microcode trace cache, which may be implemented in a ROM in some embodiments). For example, a tag identified at 1401 may be sent to an address decoder for a microcode ROM that selects an addressed ROM entry. The microcode trace at the selected ROM entry may then be transferred out of the ROM. Various register name replacements may be made with the microcode trace dependent on the alias table for that microcode subroutine. Note that in some embodiments, microcode operations may not be stored in traces. In such embodiments, after retrieving one operation from the microcode ROM, the tag may be incremented to identify the next microcode operation in the routine.

At 1407, execution of a return operation included in the microcode subroutine pops the return address from the stack. This address may then be used to fetch the next operation or the next trace to be executed subsequent to completion of the microcode subroutine.

Exemplary Computer Systems

Figure 15:
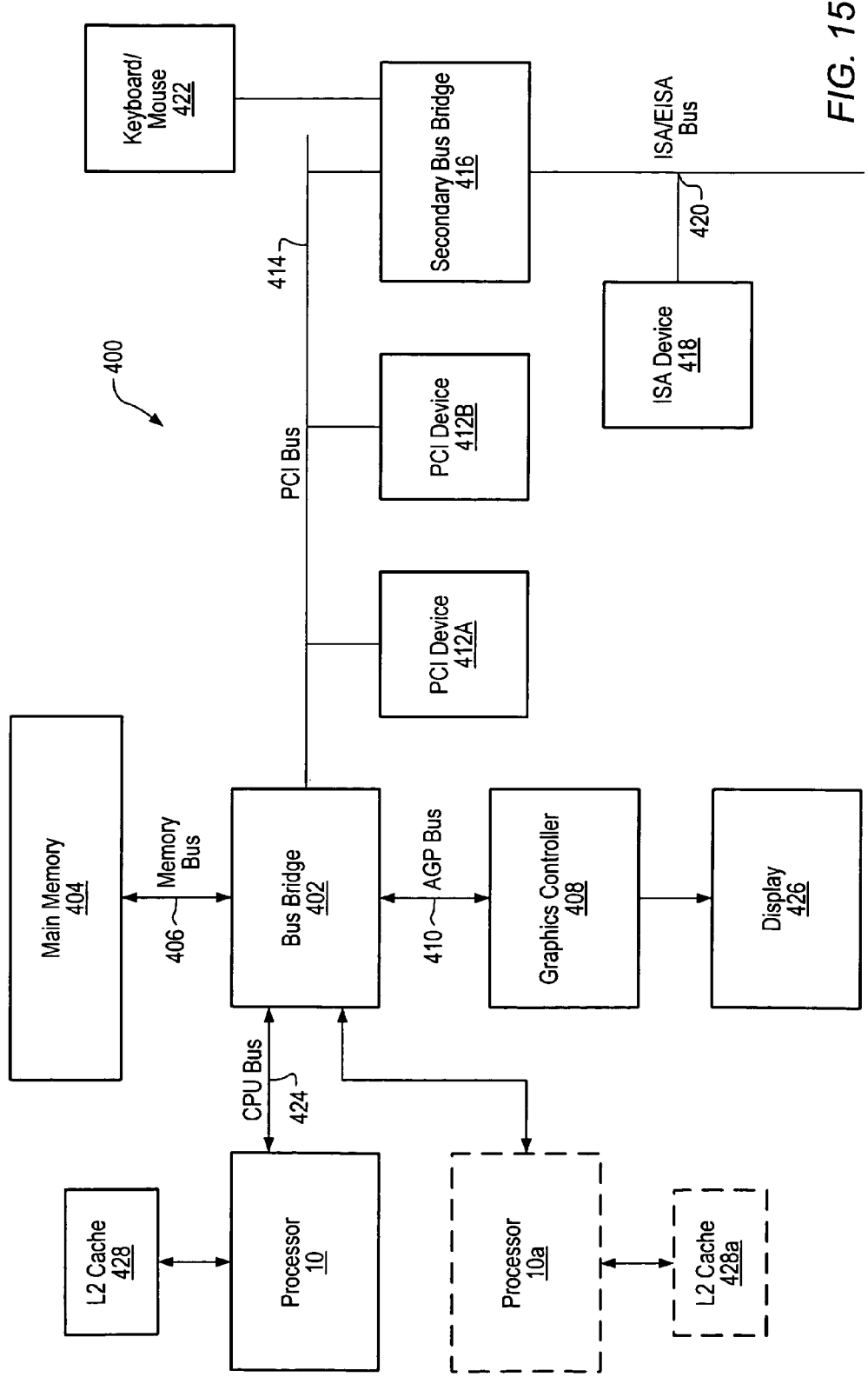
FIG. 15 shows one embodiment of a computer system.

FIG. 15 shows a block diagram of one embodiment of a computer system 400 that includes a microprocessor 100 coupled to a variety of system components through a bus bridge 402. Microprocessor 100 may include an embodiment of a dispatch unit 104, a trace cache 160, a microcode unit 150, and/or a trace cache generator 170 as described above. Other embodiments of a computer system are possible and contemplated. In the depicted system, a main memory 200 is coupled to bus bridge 402 through a memory bus 406, and a graphics controller 408 is coupled to bus bridge 402 through an AGP bus 410. Several PCI devices 412A–412B are coupled to bus bridge 402 through a PCI bus 414. A secondary bus bridge 416 may also be provided to accommodate an electrical interface to one or more EISA or ISA devices 418 through an EISA/ISA bus 420. In this example, microprocessor 100 is coupled to bus bridge 402 through a CPU bus 424 and to an optional L2 cache 428. In some embodiments, the microprocessor 100 may include an integrated L1 cache (not shown).

Bus bridge 402 provides an interface between microprocessor 100, main memory 404, graphics controller 408, and devices attached to PCI bus 414. When an operation is received from one of the devices connected to bus bridge 402, bus bridge 402 identifies the target of the operation (e.g., a particular device or, in the case of PCI bus 414, that the target is on PCI bus 414). Bus bridge 402 routes the operation to the targeted device. Bus bridge 402 generally translates an operation from the protocol used by the source device or bus to the protocol used by the target device or bus.

In addition to providing an interface to an ISA/EISA bus for PCI bus 414, secondary bus bridge 416 may incorporate additional functionality. An input/output controller (not shown), either external from or integrated with secondary bus bridge 416, may also be included within computer system 400 to provide operational support for a keyboard and mouse 422 and for various serial and parallel ports. An external cache unit (not shown) may also be coupled to CPU bus 424 between microprocessor 100 and bus bridge 402 in other embodiments. Alternatively, the external cache may be coupled to bus bridge 402 and cache control logic for the external cache may be integrated into bus bridge 402. L2 cache 428 is shown in a backside configuration to microprocessor 100. It is noted that L2 cache 428 may be separate from microprocessor 100, integrated into a cartridge (e.g., slot 1 or slot A) with microprocessor 100, or even integrated onto a semiconductor substrate with microprocessor 100.

Main memory 200 is a memory in which application programs are stored and from which microprocessor 100 primarily executes. A suitable main memory 200 may include DRAM (Dynamic Random Access Memory). For example, a plurality of banks of SDRAM (Synchronous DRAM) or Rambus DRAM (RDRAM) may be suitable.

PCI devices 412A–412B are illustrative of a variety of peripheral devices such as network interface cards, video accelerators, audio cards, hard or floppy disk drives or drive controllers, SCSI (Small Computer Systems Interface) adapters and telephony cards. Similarly, ISA device 418 is illustrative of various types of peripheral devices, such as a modem, a sound card, and a variety of data acquisition cards such as GPIB or field bus interface cards.

Graphics controller 408 is provided to control the rendering of text and images on a display 426. Graphics controller 408 may embody a typical graphics accelerator generally known in the art to render three-dimensional data structures that can be effectively shifted into and from main memory 200. Graphics controller 408 may therefore be a master of AGP bus 410 in that it can request and receive access to a target interface within bus bridge 402 to thereby obtain access to main memory 200. A dedicated graphics bus accommodates rapid retrieval of data from main memory 404. For certain operations, graphics controller 408 may further be configured to generate PCI protocol transactions on AGP bus 410. The AGP interface of bus bridge 402 may thus include functionality to support both AGP protocol transactions as well as PCI protocol target and initiator transactions. Display 426 is any electronic display upon which an image or text can be presented. A suitable display 426 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 400 may be a multiprocessing computer system including additional microprocessors (e.g., microprocessor 100a shown as an optional component of computer system 400). Microprocessor 100a may be similar to microprocessor 100. More particularly, microprocessor 100a may be an identical copy of microprocessor 100 in one embodiment. Microprocessor 100a may be connected to bus bridge 402 via an independent bus (as shown in FIG. 15) or may share CPU bus 224 with processor 100. Furthermore, microprocessor 100a may be coupled to an optional L2 cache 428a similar to L2 cache 428.

Figure 16:
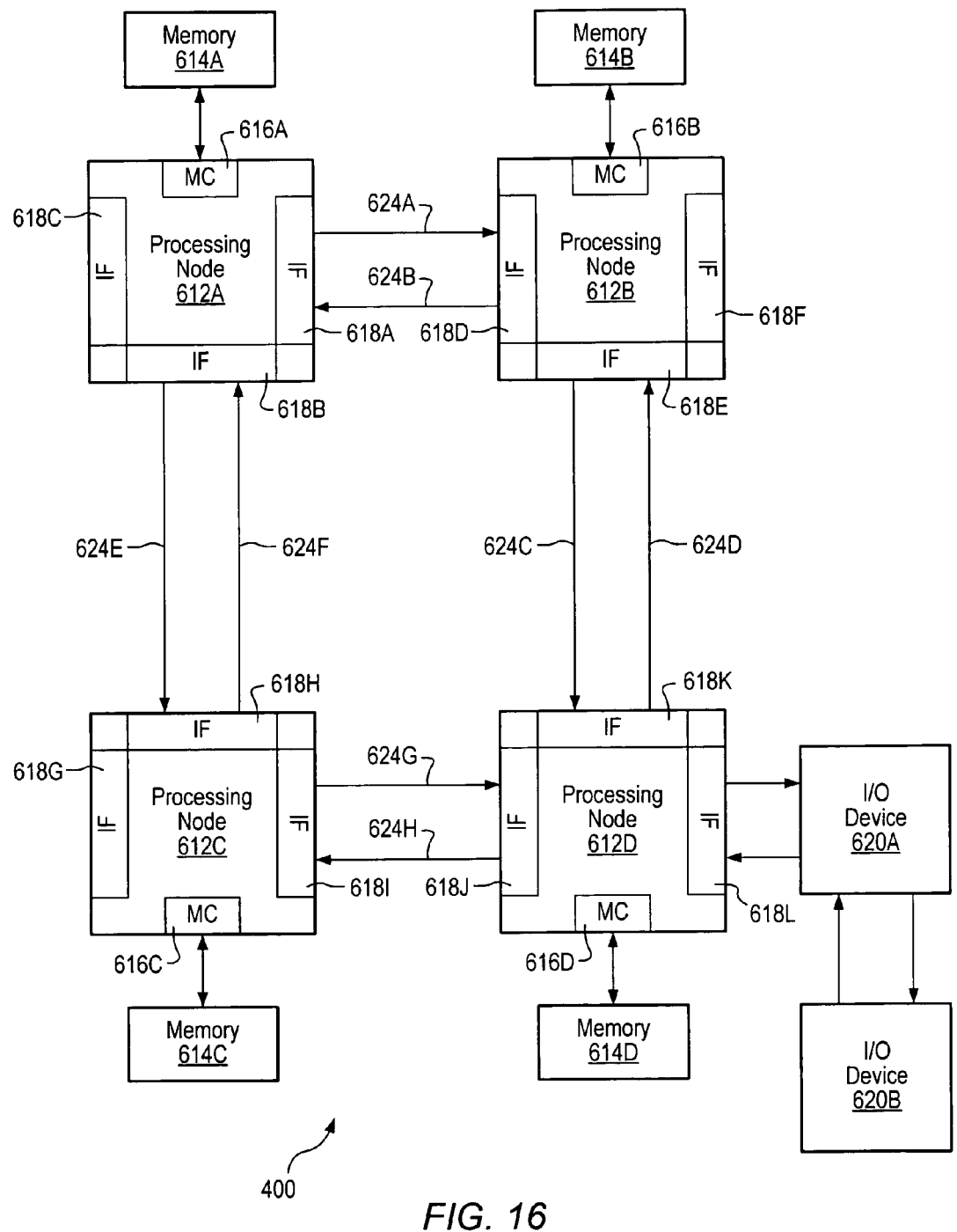
FIG. 16 shows another embodiment of a computer system.

Turning now to FIG. 16, another embodiment of a computer system 400 that may include a dispatch unit 104, a trace cache 160, a microcode unit 150, and/or a trace cache generator 170 as described above is shown. Other embodiments are possible and contemplated. In the embodiment of FIG. 16, computer system 400 includes several processing nodes 612A, 612B, 612C, and 612D. Each processing node is coupled to a respective memory 614A–614D via a memory controller 616A–616D included within each respective processing node 612A–612D. Additionally, processing nodes 612A–612D include interface logic used to communicate between the processing nodes 612A–612D. For example, processing node 612A includes interface logic 618A for communicating with processing node 612B, interface logic 618B for communicating with processing node 612C, and a third interface logic 618C for communicating with yet another processing node (not shown). Similarly, processing node 612B includes interface logic 618D, 618E, and 618F; processing node 612C includes interface logic 618G, 618H, and 618I; and processing node 612D includes interface logic 618J, 618K, and 618L. 15, Processing node 612D is coupled to communicate with a plurality of input/output devices (e.g., devices 620A–620B in a daisy chain configuration) via interface logic 618L. Other processing nodes may communicate with other I/O devices in a similar fashion.

Processing nodes 612A–612D implement a packet-based link for inter-processing node communication. In the present embodiment, the link is implemented as sets of unidirectional lines (e.g., lines 624A are used to transmit packets from processing node 612A to processing node 612B and lines 624B are used to transmit packets from processing node 612B to processing node 612A). Other sets of lines 624C–624H are used to transmit packets between other processing nodes as illustrated in FIG. 16. Generally, each set of lines 624 may include one or more data lines, one or more clock lines corresponding to the data lines, and one or more control lines indicating the type of packet being conveyed. The link may be operated in a cache coherent fashion for communication between processing nodes or in a non-coherent fashion for communication between a processing node and an I/O device (or a bus bridge to an I/O bus of conventional construction such as the PCI bus or ISA bus). Furthermore, the link may be operated in a non-coherent fashion using a daisy-chain structure between I/O devices as shown. It is noted that a packet to be transmitted from one processing node to another may pass through one or more intermediate nodes. For example, a packet transmitted by processing node 612A to processing node 612D may pass through either processing node 612B or processing node 612C as shown in FIG. 16. Any suitable routing algorithm may be used. Other embodiments of computer system 400 may include more or fewer processing nodes then the embodiment shown in FIG. 16.

Generally, the packets may be transmitted as one or more bit times on the lines 624 between nodes. A bit time may be the rising or falling edge of the clock signal on the corresponding clock lines. The packets may include command packets for initiating transactions, probe packets for maintaining cache coherency, and response packets from responding to probes and commands.

Processing nodes 612A–612D, in addition to a memory controller and interface logic, may include one or more microprocessors. Broadly speaking, a processing node includes at least one microprocessor and may optionally include a memory controller for communicating with a memory and other logic as desired. More particularly, each processing node 612A–612D may include one or more copies of microprocessor 100. External interface unit 18 may includes the interface logic 618' within the node, as well as the memory controller 616.

Memories 614A–614D may include any suitable memory devices. For example, a memory 614A–614D may include one or more RAMBUS DRAMs (RDRAMs), synchronous DRAMs (SDRAMs), static RAM, etc. The address space of computer system 400 is divided among memories 614A–614D. Each processing node 612A–612D may include a memory map used to determine which addresses are mapped to which memories 614A–614D, and hence to which processing node 612A–612D a memory request for a particular address should be routed. In one embodiment, the coherency point for an address within computer system 400 is the memory controller 616A–616D coupled to the memory storing bytes corresponding to the address. In other words, the memory controller 616A–616D is responsible for ensuring that each memory access to the corresponding memory 614A–614D occurs in a cache coherent fashion. Memory controllers 616A–616D may include control circuitry for interfacing to memories 614A–614D. Additionally, memory controllers 616A–616D may include request queues for queuing memory requests.

Interface logic 618A–618L may include a variety of buffers for receiving packets from the link and for buffering packets to be transmitted upon the link. Computer system 400 may employ any suitable flow control mechanism for transmitting packets. For example, in one embodiment, each interface logic 618 stores a count of the number of each type of buffer within the receiver at the other end of the link to which that interface logic is connected. The interface logic does not transmit a packet unless the receiving interface logic has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

I/O devices 620A–620B may be any suitable I/O devices. For example, I/O devices 620A–620B may include devices for communicate with another computer system to which the devices may be coupled (e.g., network interface cards or modems). Furthermore, I/O devices 620A–620B may include video accelerators, audio cards, hard or floppy disk drives or drive controllers, SCSI (Small Computer Systems Interface) adapters and telephony cards, sound cards, and a variety of data acquisition cards such as GPIB or field bus interface cards. It is noted that the term "1I/O device" and the term "peripheral device" are intended to be synonymous herein.

As used herein, the terms "clock cycle" or "cycle" refer to an interval of time in which the various stages of the instruction processing pipelines complete their tasks. Instructions and computed values are captured by memory elements (such as registers or arrays) according to a clock signal defining the clock cycle. For example, a memory element may capture a value according to the rising or falling edge of the clock signal.

Numerous variations and modifications will become apparent to those skilled in the art once the above disclosure is fully appreciated. It is intended that the following claims be interpreted to embrace all such variations and modifications.

What is claimed is:

1. A microprocessor, comprising:
   a trace cache comprising a plurality of trace cache entries, wherein each trace cache entry is configured to store a plurality of operations and a respective plurality of liveness indications, wherein the plurality of operations are generated by at least partially decoding a plurality of instructions;
   a trace generator configured to generate the respective plurality of liveness indications for the plurality of operations in each trace cache entry, wherein each liveness indication identifies whether execution of its respective operation depends on a branch operation stored within that trace cache entry.

2. The microprocessor of claim 1, wherein each trace cache entry includes a plurality of operation storage locations each configured to store a single operation, wherein a first portion of the plurality of operation storage locations are dedicated to storage of data operations and a second portion of the plurality of operation storage locations are dedicated to storage of memory operations.

3. The microprocessor of claim 1, further comprising a dispatch unit configured to dispatch operations, wherein the dispatch unit is configured to receive operations and their respective liveness indications from the trace cache, and wherein the dispatch unit is configured to determine whether each operation included in a same trace cache entry is executable dependent on one or more current branch predictions and the liveness indication associated with that operation.

4. The microprocessor of claim 3, wherein the dispatch unit is configured to dispatch each operation included in the same trace cache entry, wherein the dispatch unit is further configured to generate a signal indicating whether each operation is executable dependent on the liveness indication associated with that operation and the one or more current branch predictions.

5. The microprocessor of claim 4, wherein a scheduler coupled to receive dispatched operations from the dispatch unit is configured to store an indication of whether each dispatched operation is executable, and wherein the scheduler is configured to only issue executable operations to an execution core.

6. The microprocessor of claim 5, wherein in response to a branch operation resolving differently than predicted, the scheduler is configured to update one or more indications associated within one or more operations to indicate that those operations are now executable, wherein the one or more indications previously indicated that the one or more operations were not executable.

7. The microprocessor of claim 3, wherein the dispatch unit is configured to selectively dispatch operations included in the same trace cache entry dependent on whether each operation is executable.

8. The microprocessor of claim 3, further comprising a retire queue, wherein the retire queue is configured to retire operations included in the same trace cache entry in response to all executable operations within the same trace cache entry being ready for retirement.

9. The microprocessor of claim 1, wherein each liveness indication may be specified as one of a plurality of liveness encodings, wherein one liveness encoding indicates that execution of a respective operation is not dependent on any branch operations included within a same trace.

10. The microprocessor of claim 9, wherein another liveness encoding indicates that execution of the respective operation is dependent on a first branch operation included within the same trace.

11. The microprocessor of claim 9, wherein another liveness encoding indicates that execution of the respective operation is dependent on both a first and a second branch operation included within the same trace.

12. The microprocessor of claim 9, wherein another liveness encoding indicates that the respective operation is invalid.

13. The microprocessor of claim 12, wherein an operation storage location whose associated liveness indication indicates that the respective operation is invalid is stored stores additional data for use with another valid operation included in the same trace.

14. The microprocessor of claim 9, wherein operations stored within the same trace cache entry and having a same liveness encoding are not stored in adjacent operation storage locations.

15. A method, comprising:
   at least partially decoding a plurality of instructions into a plurality of operations;
   storing a trace of operations within a trace cache, wherein the trace of operations includes one or more operations that depend on a branch operation included in the trace of operations, wherein the trace of operations includes at least some of the plurality of operations; and
   generating a liveness indication for each operation included in the trace of operations, wherein the liveness indication indicates whether execution of a respective operation depends on the branch operation.

16. The method of claim 15, further comprising fetching the trace of operations from the trace cache and responsively dispatching at least some of the operations included in the trace of operations, wherein said dispatching comprises determining whether each operation included in the trace is executable dependent on one or more current branch predictions and the liveness indication associated with that operation.

17. The method of claim 16, wherein said dispatching comprises dispatching each operation included in the trace to a scheduler and generating an indication of whether each operation is executable dependent on the liveness indication associated with that operation and the one or more current branch predictions.

18. The method of claim 17, further comprising the scheduler storing the indication of whether each operation is executable; and
   the scheduler selectively issuing an operation to an execution core dependent on the indication associated with that operation.

19. The method of claim 18, further comprising the scheduler updating one or more indications associated within one or more operations to indicate that those operations are now executable in response to a branch operation resolving differently than predicted, wherein the one or more indications previously indicated that the one or more operations were not executable.

20. The method of claim 16, wherein said dispatching comprises selectively dispatching operations included in the trace dependent on whether each operation is executable.

21. The method of claim 16, further comprising a retire queue, wherein the retire queue is configured to retire operations included in the trace in response to all executable operations within the trace being ready for retirement.

22. The method of claim 15, wherein each liveness indication may be specified as one of a plurality of liveness encodings, wherein one liveness encoding indicates that execution of a respective operation is not dependent on any branch operations included within a same trace.

23. The method of claim 22, wherein another liveness encoding indicates that execution of the respective operation is dependent on a first branch operation included within the same trace.

24. The method of claim 22, wherein another liveness encoding indicates that execution of the respective operation is dependent on both a first and a second branch operation included within the same trace.

25. The method of claim 22, wherein another liveness encoding indicates that the respective operation is invalid.

26. A computer system, comprising:
    a system memory configured to store a plurality of instructions; and
    a microprocessor coupled to the system memory, wherein the microprocessor comprises:
        a trace cache comprising a plurality of trace cache entries, wherein each trace cache entry is configured to store a plurality of operations and a respective plurality of liveness indications, wherein the plurality of operations are generated by at least partially decoding the plurality of instructions;
        a trace generator configured to generate the respective plurality of liveness indications for the plurality of operations in each trace cache entry, wherein each liveness indication identifies which branch operation stored within that trace, if any, execution of a respective operation depends on.

27. The computer system of claim 26, wherein each trace cache entry includes a plurality of operation storage locations each configured to store a single operation, wherein a first portion of the plurality of operation storage locations are dedicated to storage of data operations and a second portion of the plurality of operation storage locations are dedicated to storage of memory operations.

28. The computer system of claim 26, further comprising a dispatch unit configured to dispatch operations, wherein the dispatch unit is configured to receive operations and their respective liveness indications from the trace cache, and wherein the dispatch unit is configured to determine whether each operation included in a same trace cache entry is executable dependent on one or more current branch predictions and the liveness indication associated with that operation.

29. The computer system of claim 28, wherein the dispatch unit is configured to dispatch each operation included in the same trace cache entry, wherein the dispatch unit is further configured to generate a signal indicating whether each operation is executable dependent on the liveness indication associated with that operation and the one or more current branch predictions.

30. The computer system of claim 29, wherein a scheduler coupled to receive dispatched operations from the dispatch unit is configured to store an indication of whether each dispatched operation is executable, and wherein the scheduler is configured to only issue executable operations to an execution core.

31. The computer system of claim 30, wherein in response to a branch operation resolving differently than predicted, the scheduler is configured to update one or more indications associated within one or more operations to indicate that those operations are now executable, wherein the one or more indications previously indicated that the one or more operations were not executable.

32. The computer system of claim 28, wherein the dispatch unit is configured to selectively dispatch operations included in the same trace cache entry dependent on whether each operation is executable.

33. The computer system of claim 28, further comprising a retire queue, wherein the retire queue is configured to retire operations included in the same trace cache entry in response to all executable operations within the same trace cache entry being ready for retirement.

34. The computer system of claim 26, wherein each liveness indication may be specified as one of a plurality of liveness encodings, wherein one liveness encoding indicates that execution of a respective operation is not dependent on any branch operations included within a same trace.

35. The computer system of claim 34, wherein another liveness encoding indicates that execution of the respective operation is dependent on a first branch operation included within the same trace.

36. The computer system of claim 34, wherein another liveness encoding indicates that execution of the respective operation is dependent on both a first and a second branch operation included within the same trace.

37. The computer system of claim 34, wherein another liveness encoding indicates that the respective operation is invalid.

38. The computer system of claim 37, wherein an operation storage location whose associated liveness indication indicates that the respective operation is invalid is stored stores additional data for use with another valid operation included in the same trace.

39. The computer system of claim 34, wherein operations stored within the same trace cache entry and having a same liveness encoding are not stored in adjacent operation storage locations.

40. The computer system of claim 26, wherein if an operation of a certain type is stored within a trace cache entry, the trace generator is configured to not store any operations dependent on that operation within that trace cache entry.

41. A device, comprising:
    means for at least partially decoding a plurality of instructions into a plurality of operations;
    means for storing a trace of operations, wherein the trace of operations includes one or more operations that depend on a branch operation included in the trace of operations, wherein the trace of operations includes at least some of the plurality of operations; and
    means for generating a liveness indication for each operation included in the trace of operations, wherein the liveness indication indicates whether execution of a respective operation depends on the branch operation.

42. A microprocessor, comprising:
    a trace cache comprising a plurality of trace cache entries, wherein each trace cache entry is configured to store a plurality of operations and a respective plurality of liveness indications, wherein each liveness indication identifies whether execution of its respective operation depends on a branch operation stored within that trace cache entry;
    a dispatch unit configured to receive a trace of operations stored in one of the plurality of trace cache entries from the trace cache, wherein the dispatch unit is configured to handle each operation in the trace dependent on the respective liveness indication associated with that operation.

43. The microprocessor of claim 42, wherein the dispatch unit is configured to use the respective liveness indication associated with each operation in the trace and a branch prediction to determine whether that operation is issuable.

44. The microprocessor of claim 42, wherein the dispatch unit is configured to use the respective liveness indication associated with each operation in the trace to determine which register assignment to use when performing register renaming for that operation.

45. The microprocessor of claim 42, further comprising a trace generator, wherein the trace generator is configured to reduce ordering constraints between operations in the trace having a same liveness indication.

46. The microprocessor of claim 42, wherein the dispatch unit is configured to use the respective liveness indication associated with each operation in the trace to determine whether that operation is issuable in response to detection of a mispredicted branch within the trace.

* * * * *